United States Patent
Takahashi et al.

(10) Patent No.: US 8,260,051 B2
(45) Date of Patent: Sep. 4, 2012

(54) IMAGE PROCESSING APPARATUS FOR GENERATING AND TRANSMITTING PUSH-TYPE DATA

(75) Inventors: Seiji Takahashi, Tokyo (JP); Yuichiro Sakuta, Kanagawa (JP); Hiroshi Ota, Tokyo (JP); Masaki Tasaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 365 days.

(21) Appl. No.: 12/580,326

(22) Filed: Oct. 16, 2009

(65) Prior Publication Data
US 2010/0098336 A1   Apr. 22, 2010

(30) Foreign Application Priority Data

Oct. 20, 2008   (JP) ................................. 2008-269922
Sep. 2, 2009    (JP) ................................. 2009-202924

(51) Int. Cl.
G06K 9/34   (2006.01)
G06K 9/36   (2006.01)
G06K 9/00   (2006.01)

(52) U.S. Cl. ...................................... 382/176; 382/282

(58) Field of Classification Search .................. 382/176, 382/177, 187, 190, 195, 198, 282, 284, 290, 382/295, 299; 358/1.2, 403, 450, 452, 453, 358/538, 540; 345/629, 630, 634, 635; 348/207.1, 348/584, 588
See application file for complete search history.

(56) References Cited

U.S. PATENT DOCUMENTS

| | | | |
|---|---|---|---|
| 5,444,550 A * | 8/1995 | Enokida et al. | 358/453 |
| 6,169,998 B1 | 1/2001 | Iwasaki et al. | |
| 6,996,293 B1 * | 2/2006 | Watanabe | 382/284 |
| 7,545,992 B2 | 6/2009 | Kato et al. | |
| 7,559,024 B2 | 7/2009 | Mori et al. | |
| 2004/0239765 A1 * | 12/2004 | Kuromatsu | 348/207.1 |
| 2008/0100873 A1 * | 5/2008 | Ohtsu | 358/403 |
| 2009/0234882 A1 * | 9/2009 | Ota et al. | 707/103 R |
| 2009/0271452 A1 * | 10/2009 | Tasaka et al. | 707/203 |
| 2010/0098336 A1 * | 4/2010 | Takahashi et al. | 382/176 |
| 2010/0145480 A1 * | 6/2010 | Yoshikawa | 700/19 |
| 2010/0299355 A1 * | 11/2010 | Shiiyama et al. | 707/769 |

FOREIGN PATENT DOCUMENTS

| | | |
|---|---|---|
| JP | 11-025113 | 1/1999 |
| JP | 2000-295398 | 10/2000 |
| JP | 2003-091526 | 3/2003 |
| JP | 2004-192248 | 7/2004 |
| JP | 2006-023942 | 1/2006 |
| JP | 2009-064080 | 3/2009 |
| JP | 2009-075879 | 4/2009 |

* cited by examiner

Primary Examiner — Amir Alavi
(74) Attorney, Agent, or Firm — IPUSA, PLLC

(57) ABSTRACT

An image processing apparatus including an input part configured to input document data of a document, an extracting part configured to automatically extract partial image data from the document data, a storage part configured to store the document data and configuration data of the document data, a registering part configured to associate the document data with the partial image data and register the document data and the associated partial image data in the storage part, a generating part configured to generate push-type data based on the configuration data, and a transmitting part configured to transmit the push-type data.

14 Claims, 47 Drawing Sheets

FIG.10

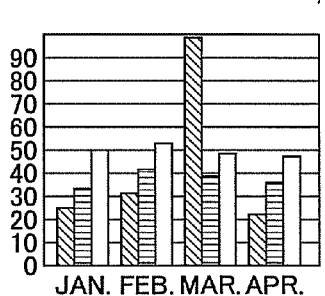

TABLE 1. TARGET ACHIEVEMENT RATIO OF 3 MAJOR CITIES

[PARTIAL IMAGE ID] 0001
[STORED LOCATION] repository/0001.pdf
[IMAGE TYPE DATA] IMAGE
[GROUP DATA]

| ELECTRONIC DOCUMENT ID | PAGE ID |
|---|---|
| 0100 | 0010 |

[USER] DocumentCriperUserA
[COORDINATE DATA] (10, 10, 200, 100)
[TEXT DATA]
TABLE 1. TARGET ACHIEVEMENT RATIO OF 3 MAJOR CITIES
[SCANNED TIME]
  Sun, 19 May 2008 15:21:36 GM

[CONFERENCE MINUTES] CONFERENCE FOR IMPROVING TARGET PRECISION

[BACKGROUND]
INVESTIGATED TARGET ACHIEVEMENT RATIO AT EACH SALES BASE OF COMPANY A.
AIM TO IMPROVE PRECISION OF TARGET VALUE AT EACH SALES BASE.
[MEMBER]
MR. A, MR. B
[PLACE]
G CONFERENCE ROOM.
[DECIDED MATTERS]
OUTPUT MONTHLY AVERAGE OF EACH BASE.
AIM 10% INCREASE OF MONTHLY AVERAGE.

[PARTIAL IMAGE ID] 0002
[STORED LOCATION] repository/0002.pdf
[IMAGE TYPE DATA] TEXT
[GROUP DATA]

| ELECTRONIC DOCUMENT ID | PAGE ID |
|---|---|
| 0100 | 0010 |

[COORDINATE DATA] (20, 20, 200, 100)
[USER] DocumentCriperUserA
[TEXT DATA]
[CONFERENCE MINUTES] CONFERENCE FOR IMPROVING TARGET PRECISION

[BACKGROUND]
INVESTIGATED TARGET ACHIEVEMENT RATIO AT EACH SALES BASE OF COMPANY A.
AIM TO IMPROVE PRECISION OF TARGET VALUE AT EACH SALES BASE.
[MEMBER]
MR. A, MR. B
[PLACE]
G CONFERENCE ROOM.
[DECIDED MATTERS]
OUTPUT MONTHLY AVERAGE OF EACH BASE.
AIM 10% INCREASE OF MONTHLY AVERAGE.

[SCANNED TIME]
  Sun, 19 May 2008 15:21:36 GM

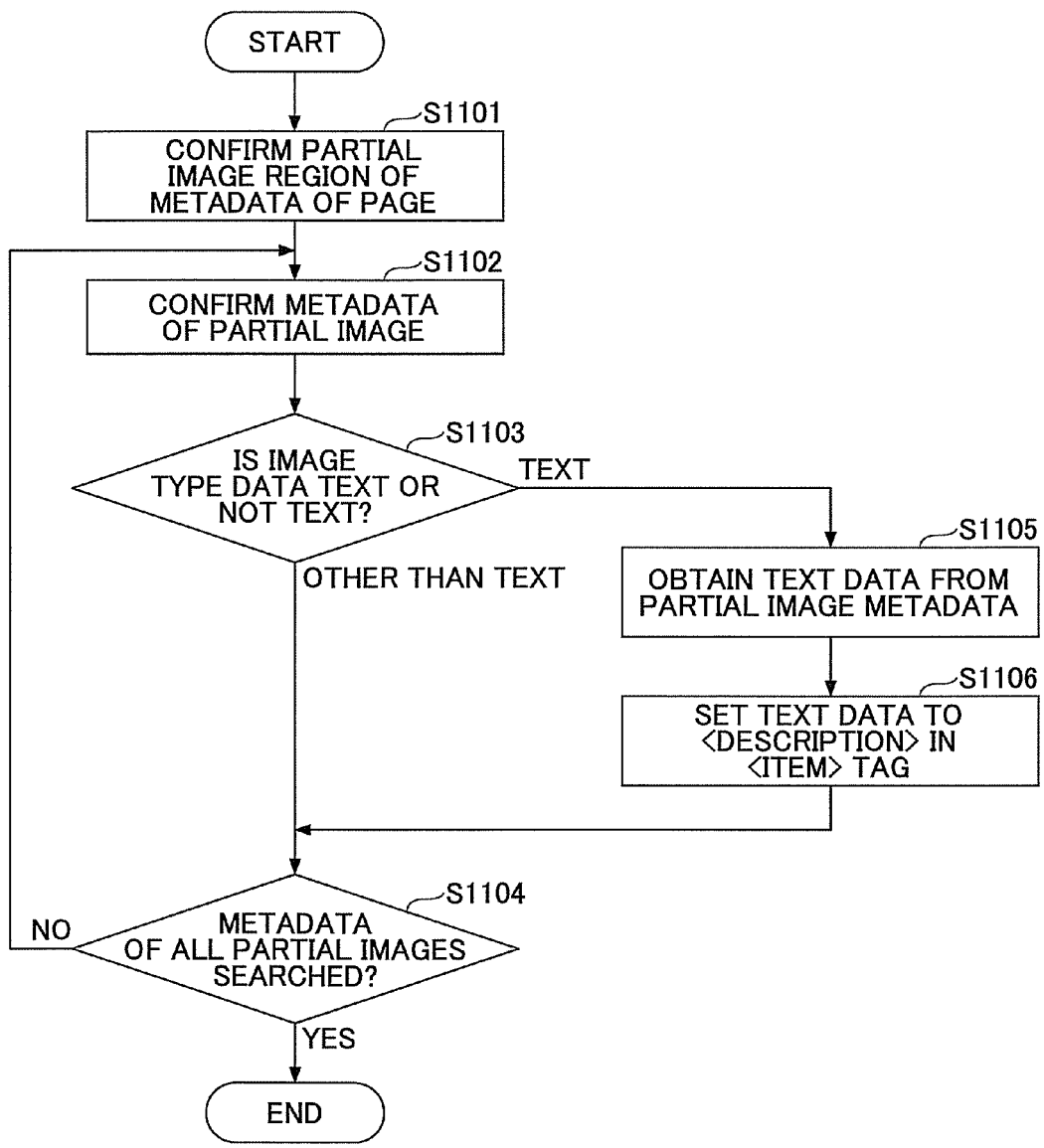

FIG.15 ~150

```
<channel>
        <title>MFP RSS DOCUMENT TRANSMISSION mfpHostName</title>
        <link>http://printerIPAddress/</link>
        <description>
                FUNCTION OF USING SCANNER, CONVERTING ANALOG DATA
TO RSS DATA, AND TRANSMITTING TO LOCAL NETWORK
        </description>

<language>ja</language>
        <managingEditor>rssManagerPrinterA@rxxxh.co.jp</managingEditor>  }155
        <webmaster>machineManage@ rxxxh.co.jp</webmaster>
        <pubDate>Sun, 19 May 2008 15:21:36 GMT</pubDate>
        <lastBuildDate>Sun, 19 May 2008 15:21:36 GMT</lastBuildDate>
        <image>
                <url>http://printerIPAddress/images/rxxxh.gif</url>
                <title>Rxxxh</title>
                <link>http://www.rxxxh.co.jp</link>
        </image>

<item>
                <title>CONFERENCE FOR IMPROVING TARGET PRECISION</title>
                <link>http://printerIPAddress/repository/MyDoc.pdf</link>  }153
                <description>
                        [CONFERENCE MINUTES]  CONFERENCE FOR
                        IMPROVING TARGET PRECISION

[BACKGROUND]
                        INVESTIGATED TARGET ACHIEVEMENT RATIO
                        AT EACH SALES BASE OF COMPANY A.
                        AIM TO IMPROVE PRECISION OF TARGET VALUE
                        AT EACH SALES BASE.                                    ~151
                        [MEMBER]
                        MR.A, MR.B
                        [PLACE]
                        G CONFERENCE ROOM.
                        [DECIDED MATTERS]
                        OUTPUT MONTHLY AVERAGE OF EACH BASE.
                        AIM 10% INCREASE OF MONTHLY AVERAGE.
                </description>
                <authour>DocumentCriperUserA</authour>  }154
                <category>DocumentCripper</category>
                <comments>
                <guid>http://printerIPAddress/repository/MyDoc.pdf</guid>
                <enclosure url="http://printerIPAddress/repository/001.pdf"  }152
length="16320"type="image/gif"/>
                <pubDate>Sun, 19 May 2008 15:21:36 GMT</pubDate>
                <source />
        </item>
</channel>    ~156
```

```
<item>
    <title>SALES PRICE</title>
    <link>http://printerIPAddress/repository/SalesPrice.pdf</link>
    <description>
        【CONFERENCE MINUTES】 SALES PRICE CONFERENCE

[BACKGROUND]
        DECIDE SALES PRICE FOR PRODUCT A.
        AIM TO IMPROVE PRECISION OF TARGET VALUE AT EACH SALES BASE.
        [MEMBER]
        MR.A, MR.B
        [PLACE]
        G CONFERENCE ROOM.
        [DECIDED MATTERS]
        PROPOSAL A DECIDED
    </description>
    <authour>DocumentCriperUserB</authour>
    <category>DocumentCripper</category>
    <comments>
    <guid>http://printerIPAddress/repository/SalesPrice.pdf</guid>
    <enclosure url="http://printerIPAddress/repository/2201.pdf"length="8000"
type="image/gif"/>
    <pubDate>Sun, 19 May 2008 18:00:36 GMT</pubDate>
    <source>
</item>
```

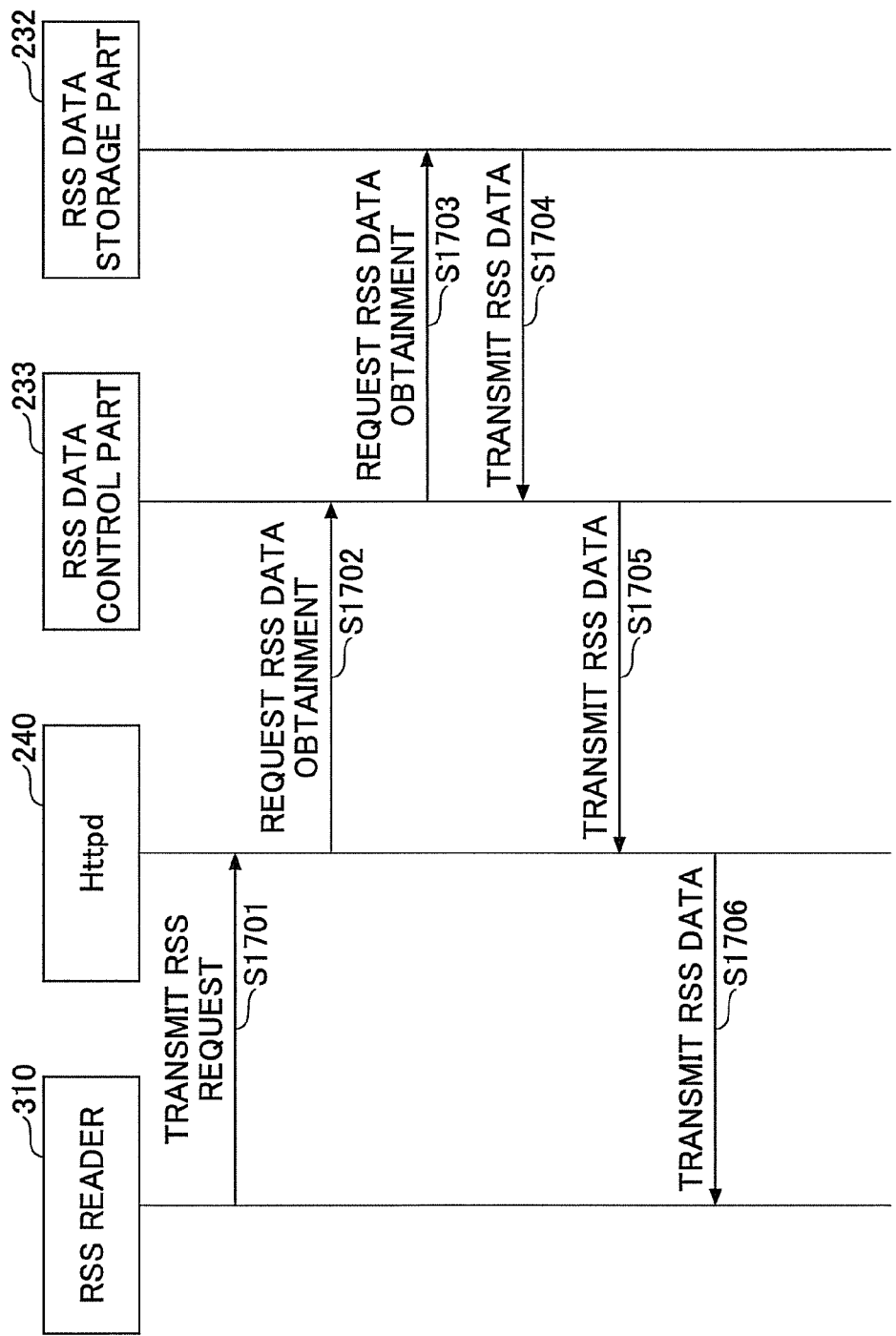

FIG.19

[CONFERENCE MINUTES] CONFERENCE FOR IMPROVING TARGET PRECISION
[BACKGROUND]
INVESTIGATED TARGET ACHIEVEMENT RATIO AT EACH SALES BASE OF COMPANY A.
AIM TO IMPROVE PRECISION OF TARGET VALUE AT EACH SALES BASE.
[MEMBER]   MR.A, MR.B
[PLACE]   G CONFERENCE ROOM.
[DECIDED MATTERS]
OUTPUT MONTHLY AVERAGE OF EACH BASE.
AIM 10% INCREASE OF MONTHLY AVERAGE.

EXTENSION OF HTML DOCUMENT MAY BE .html OR .htm. ORIGINALLY, BECAUSE ONLY EXTENSIONS WITH 3 LETTERS OR LESS COULD BE USED FOR THE OLD OS (E.G., MS-DOS, Window 3.1) OF MICROSOFT (REGISTERED TRADEMARK), .html WAS WRITTEN AS .htm AND .jpeg WAS WRITTEN AS .jpg.
THEREFORE, THERE ARE BOTH .html AND .htm.

ALTHOUGH THE EXTENSION .shtml CAN SOMETIMES BE FOUND, THIS EXTENSION IS OFTEN USED FOR AN HTML DOCUMENT CONTAINING SSI. BECAUSE A WEB SERVER NEEDS TO INTERPRET ALL OF THE HTML DOCUMENT FOR EXECUTING SSI, THE WORKLOAD OF THE WEB SERVER CAN BE REDUCED BY SETTING "DO NOT INTERPRET SSI FOR .html OR .htm AND INTERPRET SSI ONLY FOR .stml".

```
<item>
  <title>[UPDATE] :CONFERENCE FOR IMPROVING TARGET PRECISION</title>
  <link>http://printerIPAddress/repository/MyDoc.pdf</link>
  <description>
    [CONFERENCE MINUTES]  CONFERENCE FOR IMPROVING TARGET PRECISION

[BACKGROUND]
    INVESTIGATED TARGET ACHIEVEMENT RATIO AT EACH SALES BASE OF
    COMPANY A.
    AIM TO IMPROVE PRECISION OF TARGET VALUE AT EACH SALES BASE.
    [MEMBER]
    MR.A, MR.B
    [PLACE]
    G CONFERENCE ROOM.
    [DECIDED MATTERS]
    OUTPUT MONTHLY AVERAGE OF EACH BASE.
    AIM 10% INCREASE OF MONTHLY AVERAGE.
  </description>
  <authour>DocumentCriperUserA</authour>
  <category>DocumentCripper</category>
  <comments>
    CHANGE IMAGE: "/repository/0001.pdf" → "/repository/0001New.pdf"
  <guid>http://printerIPAddress/rss/12346</guid>
  <enclosure url="http://printerIPAddress/repository/0001New.pdf"length=
"16320"type="image/gif"/>
  <pubDate>Sun, 19 May 2008 16:21:36 GMT</pubDate>
```

FIG.24

```
<item>
  <title>[PAGE HAS BEEN DELETED]:CONFERENCE FOR IMPROVING TARGET PRECISION</title>
  <link>
  http://printerIPAddress/web/entry/webdocbox/docListPage.cgi
  </link>
  <description>
  IN A CASE OF RECOVERING A DOCUMENT, IT CAN BE RECOVERED BY COMBINING THE FOLLOWING DOCUMENT.
  2 IMAGES
  [STORED LOCATION] repository/0001.pdf
  [IMAGE REGION] (20, 20, 200, 100)
  [STORED LOCATION] repository/0002.pdf
  [IMAGE REGION] (10, 10, 200, 100)
  </description>
  <authour>DocumentCriperUserA</authour>
  <category>DocumentCripper</category>
  <guid>http://printerIPAddress/rss/12346</guid>
  <pubDate>Sun, 19 May 2008 16:21:36 GMT</pubDate>
  <source>
</item>
```

```
<item>
   <title>[PARTIAL IMAGE HAS BEEN DELETED.]:CONFERENCE FOR IMPROVING TARGET PRECISION</title>
   <link>http://printerIPAddress/repository/MyDoc.pdf</link>
   <description>
      NEXT DOCUMENT HAS BEEN DELETED.
      repository/0001.pdf
      [IMAGE REGION] (20, 20, 200, 100)
   </description>
   <authour>DocumentCripperUserA</authour>
   <category>DocumentCripper</category>
   <guid>http://printerIPAddress/rss/12346</guid>
   <pubDate>Sun, 19 May 2008 16:21:36 GMT</pubDate>
   <source>
</item>
```

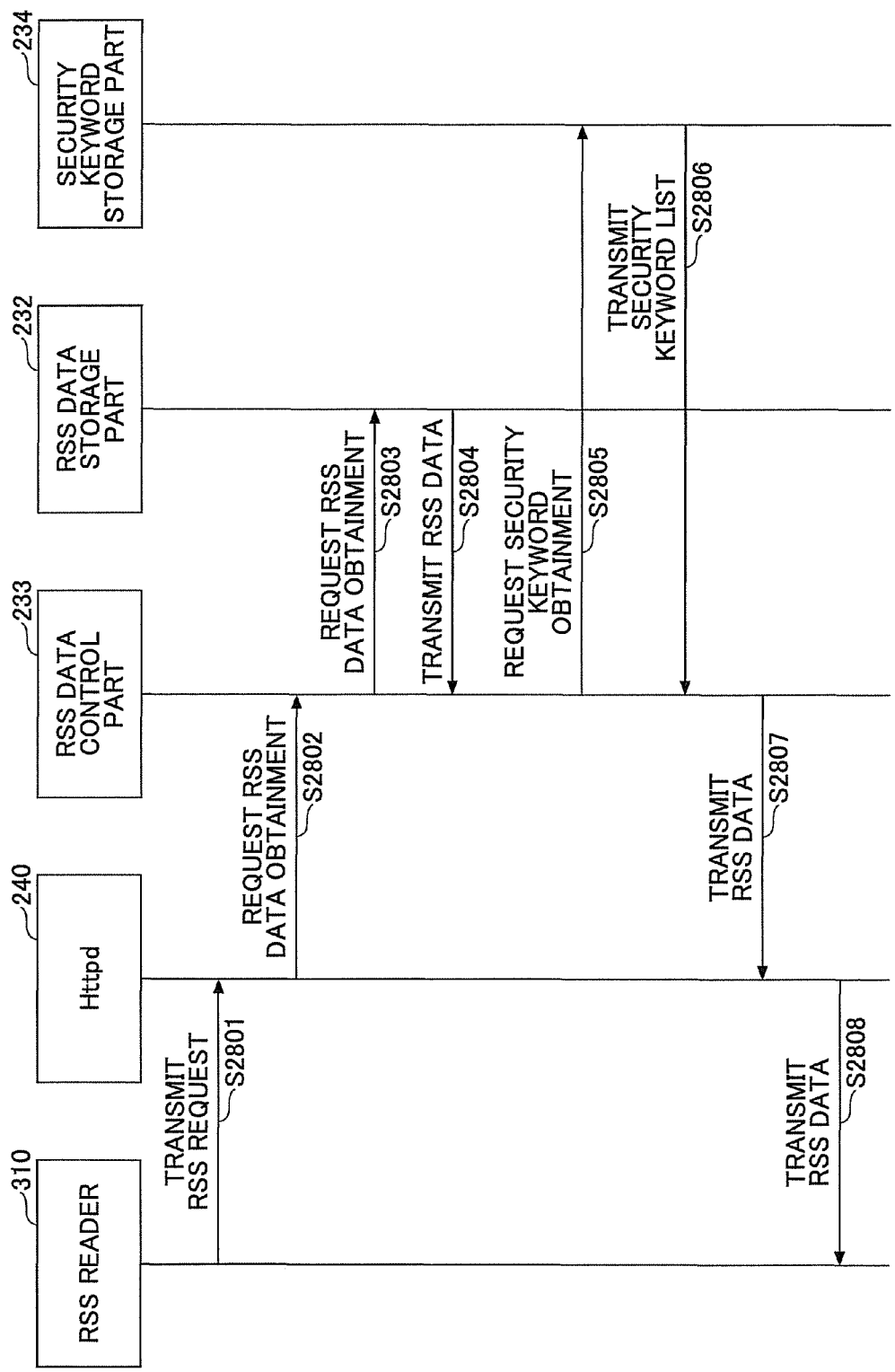

FIG.30

```
<item>
    <title>SECURITY STUDY GROUP</title>
    <link>http://printerIPAddress/repository/MyDoc.pdf</link>
    <description>
        KNOWN SECURITY HOLE IN LOCAL NETWORK SECURITY
    </description>
    <authour>DocumentCriperUserA</authour>
    <category>DocumentCripper</category>
    <guid>http://printerIPAddress/rss/12346</guid>
    <enclosure url="http://printerIPAddress/repository/sedfs.pdf" length="16320" type="image/gif" />
    <pubDate>Sun, 19 May 2008 16:21:36 GMT</pubDate>
    <source>
</item>
```

FIG.31

```
                                                        ~165
<channel>
        <title>MFP RSS DOCUMENT TRANSMISSION mfpHostName</title>
        <link>http://printerIPAddress/</link>
        <description>
                FUNCTION OF USING SCANNER, CONVERTING ANALOG
DATA TO RSS DATA, AND TRANSMITTING TO LOCAL NETWORK
        </description>

<language>ja</language>
        <managingEditor>rssManagerPrinterA@rxxxh.co.jp</managingEditor>
        <webmaster>machineManage@ rxxxh.co.jp</webmaster>
        <pubDate>Sun, 19 May 2008 15:21:36 GMT</pubDate>
        <lastBuildDate>Sun, 19 May 2008 15:21:36 GMT</lastBuildDate>
        <image>
                <url>http://printerIPAddress/images/rxxxh.gif</url>
                <title>Rxxxh</title>
                <link>http://www.rxxxh.co.jp</link>
        </image>

<item>
                <title>CONFERENCE FOR IMPROVING TARGET PRECISION</title>
                <link>http://printerIPAddress/repository/MyDoc.pdf</link>
                <description>
                        [CONFERENCE MINUTES] CONFERENCE FOR
                        IMPROVING TARGET PRECISION

[BACKGROUND]
                        INVESTIGATED TARGET ACHIEVEMENT RATIO AT
                        EACH SALES BASE OF COMPANY A.
                        AIM TO IMPROVE PRECISION OF TARGET VALUE
                        AT EACH SALES BASE.
                        [MEMBER]
                        MR.A, MR.B
                        [PLACE]
                        G CONFERENCE ROOM.
                        [DECIDED MATTERS]
                        OUTPUT MONTHLY AVERAGE OF EACH BASE.
                        AIM 10% INCREASE OF MONTHLY AVERAGE.
                </description>
                <authour>DocumentCriperUserA</authour>
                <category>DocumentCripper</category>
                <comments>
                <guid>http://printerIPAddress/repository/MyDoc.pdf</guid>
                <enclosure url="http://printerIPAddress/repository/001.pdf"
length="16320" type="image/gif" />
                <pubDate>Sun, 19 May 2008 15:21:36 GMT</pubDate>
                <source />
        </item>                                 ~166
        ┌─────────────────────────────────────────┐
        │                                         │
        │                                         │
        └─────────────────────────────────────────┘
</channel>
```

FIG.33

```
┌─────────────────────────────────────────────────────────────────────┐
│                                                              ~62    │
│  RSS TRANSMISSION SETTINGS  BASIC SETTINGS                          │
│                                                                      │
│   ┌────┐ ┌────────┐                                                 │
│   │ OK │ │ CANCEL │                                                 │
│   └────┘ └────────┘                                                 │
│                                                                      │
│  ■ RSS TRANSMISSION SETTINGS           : ⊙ VALID  ○ INVALID         │
│  ■ AUTOMATIC RSS TRANSMISSION          : ⊙ VALID  ○ INVALID         │
│    WHEN READING DATA WITH SCANNER                                   │
│                                                         64          │
│  AUTOMATIC DIVISION TRANSMISSION    63 ☑ ORIGINAL DATA  ☑ PARTIAL IMAGE │
│  SETTINGS                           :: ☑ IMAGE TYPE BASED TRANSMISSION │
│  ■ DOCUMENT TRANSMISSION SETTINGS   :: ☑ SCANNING USER DISTRIBUTION TRANSMISSION │
│  ■ METADATA TRANSMISSION SETTINGS   :: ☑ SCANNING TIME DISTRIBUTION TRANSMISSION │
│                                  65 :: ☐ TIME UNITS ☑ DAY UNITS ☐ WEEK UNITS │
│                                                                      │
│   ┌────┐ ┌────────┐                                                 │
│   │ OK │ │ CANCEL │                                                 │
│   └────┘ └────────┘                                                 │
└─────────────────────────────────────────────────────────────────────┘
```

FIG.35

RSS CHANNEL ORIGINAL

| OK | CANCEL |

RSS CHANNEL ORIGINAL

- CHANNEL TITLE : ORIGINAL
- CHANNEL PATH : http://printerIPAddress/rss/original/top.xml
- MANAGING EDITOR : rssManagerPrinterA@rxxxh.co.jp
- RSS TRANSMISSION LANGUAGE : English
- WEBMASTER : machineManage@rxxxh.co.jp
- RSS IMAGE PATH : /images/rxxxh.gif
- RSS IMAGE TITLE : Rxxxh
- RSS IMAGE LINK DESTINATION : http://www.rxxxh.co.jp

| OK | CANCEL |

[PARTIAL IMAGE ID] 0001
[STORED LOCATION] repository/011.pdf
[IMAGE TYPE DATA] TABLE

[GROUP DATA]

| ELECTRONIC DOCUMENT ID | PAGE ID |
|---|---|
| 0100 | 0010 |

[USER] DocumentCriperUserA
[COORDINATE DATA] (10, 10, 200, 100)
[TEXT DATA]
TABLE 1. TARGET ACHIEVEMENT RATIO OF 3 MAJOR CITIES
[SCANNED TIME]
    Sun, 19 May 2008 15:21:36 GM

FIG.39

```
<item>
  <title>TABLE 1</title>}LINE 391
  <link>http://printerIPAddress/repository/SalesPrice.pdf</link>
  <description>
                TABLE 1. TARGET ACHIEVEMENT RATIO OF 3 MAJOR CITIES }LINE 392

</description>
  <authour>DocumentCriperUserB</authour>
  <category>DocumentCripper</category>
  <comments>
  <guid>http://printerIPAddress/repository/SalesPrice.pdf</guid>
  <enclosure url="http://printerIPAddress/repository/2201.pdf"length="8000"
type="image/gif"/>
  <pubDate>Sun, 19 May 2008 18:00:36 GMT</pubDate>
  <source>
</item>
```

[PARTIAL IMAGE ID] 0002
[STORED LOCATION] repository/0001.pdf
[IMAGE TYPE DATA] DRAWING

| [GROUP DATA] | ELECTRONIC DOCUMENT ID | PAGE ID |
|---|---|---|
| | 0100 | 0010 |

[USER] DocumentCriperUserA
[COORDINATE DATA] (10, 10, 200, 100)
[SCANNED TIME]
　　Sun, 19 May 2008 15:21:36 GM

FIG.42

```
<item>
    <title>Sun, 19 May 2008 15:21:36 GM</title>}—LINE 383
    <link>http://printerIPAddress/repository/SalesPrice.pdf</link>
    <description>
                    DocumentCriperUserA
    </description>
    <authour>DocumentCriperUserB</authour>
    <category>DocumentCriper</category>
    <comments>
    <guid>http://printerIPAddress/repository/SalesPrice.pdf</guid>    ⎫
    <enclosure url="http://printerIPAddress/repository/2201.pdf" length="8000"  ⎬ LINE 384
type="image/gif"/>                                                               ⎭
    <pubDate>Sun, 19 May 2008 18:00:36 GMT</pubDate>
    <source>
</item>
```

FIG.44

| TITLE | KEYWORD | DESCRIPTION 440 |
|---|---|---|
| CONFERENCE A | TARGET | EVERY FRIDAY 5 PM-REGULAR |
| ... | ... | ... |

FIG.45

RSS CHANNEL ORIGINAL

[ OK ] [ CANCEL ]

RSS CHANNEL ORIGINAL

- CHANNEL TITLE : ORIGINAL
- CHANNEL PATH : http://printerIPAddress/rss/original/top.xml
- MANAGING EDITOR : rssManagerPrinterA@rxxxh.co.jp
- RSS TRANSMISSION LANGUAGE : English
- WEBMASTER : machineManage@rxxxh.co.jp
- RSS IMAGE PATH : /images/rxxxh.gif
- RSS IMAGE TITLE : Rxxxh
- RSS IMAGE LINK DESTINATION : http://www.rxxxh.co.jp
- COMBINED TRANSMISSION SETTINGS : YES⊙ NO○ NUMBER OF COMBINED IMAGES [ ] ⎬68B

[ OK ] [ CANCEL ]

68A

IMAGE PROCESSING APPARATUS FOR GENERATING AND TRANSMITTING PUSH-TYPE DATA

BACKGROUND OF THE INVENTION

1. Field of the Invention

The present invention generally relates to an image processing apparatus such as a facsimile machine, a printer, a scanner, a copier, a multifunction machine, or a WEB server.

2. Description of the Related Art

Conventionally, there is an image processing apparatus that divides a scanned document (electronic document) into plural units of pages or partial images and enables the divided document to be displayed, searched, or attached to other applications in units of pages or partial images (see, for example, Japanese Laid-Open Patent Publication No. 11-25113).

There is also an image processing apparatus that applies partial images having meta attributes to pages or electronic documents that include other partial images. There is also an image processing apparatus that transmits a scanned document by using a push server.

There is also an image processing apparatus that sends electronic mail to a predetermined destination indicating the location in which image data are to be stored (see, for example, Japanese Laid-Open Patent Publication No. 2006-23942). There is also an image processing apparatus that edits a hierarchical structure of data by taking advantages of data and setting values (settings) managed in a hierarchical manner (see, for example, Japanese Laid-Open Patent Publication No. 2004-192248).

Although the above-described conventional image processing apparatuses are capable of editing document data having a hierarchical structure, the image processing apparatuses face the burden of setting transmission data to the edited document data each time of transmitting the edited document data.

SUMMARY OF THE INVENTION

The present invention may provide an image processing apparatus that substantially eliminates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image processing apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image processing apparatus including an input part configured to input document data of a document, an extracting part configured to automatically extract partial image data from the document data, a storage part configured to store the document data and configuration data of the document data, a registering part configured to associate the document data with the partial image data and register the document data and the associated partial image data in the storage part, a generating part configured to generate push-type data based on the configuration data, and a transmitting part configured to transmit the push-type data.

Other objects, features and advantages of the present invention will become more apparent from the following detailed description when read in conjunction with the accompanying drawings.

BRIEF DESCRIPTION OF THE DRAWINGS

FIG. 10 is a second schematic diagram illustrating registration data according to an embodiment of the present invention;

FIG. 11 is a flowchart illustrating an exemplary operation of extracting text data from registration data with an RSS data generating part according to an embodiment of the present invention;

FIG. 15 is a schematic drawing illustrating an exemplary configuration of RSS data according to an embodiment of the present invention;

FIG. 16 is a schematic diagram illustrating an example of new RSS data which is to be added to RSS data according to an embodiment of the present invention;

FIG. 17 is a sequence diagram for describing an operation of transmitting RSS data with an image processing system according to an embodiment of the present invention;

FIG. 19 is a schematic diagram illustrating an example of the text data of RSS data having been read out according to an embodiment of the present invention;

FIG. 22 is a schematic diagram illustrating update RSS data of the RSS data of FIG. 15;

FIG. 24 is a schematic diagram illustrating an example of deletion RSS data that is generated by the operation of FIG. 23;

FIG. 25 is a schematic diagram illustrating an example of an Index page according to an embodiment of the present invention;

FIG. 27 is a schematic diagram illustrating an example of deletion RSS data generated by the operation of FIG. 26;

FIG. 28 is a sequence diagram illustrating a security control operation performed with an image processing apparatus according to an embodiment of the present invention;

FIG. 30 is a schematic diagram illustrating an example of an item of RSS data deleted by an RSS data control part by the operation of FIG. 29;

FIG. 31 is a schematic diagram illustrating an example RSS data generated based on the operation of FIG. 29;

FIG. 33 is a schematic diagram illustrating another example of a setting screen displayed on a web browser according to an embodiment of the present invention;

FIG. 35 illustrates an example of a setting screen for <RSS channel original> according to an embodiment of the present invention;

FIG. 38 is a schematic diagram illustrating an example of partial image metadata corresponding to a partial image data according to an embodiment of the present invention;

FIG. 39 is a schematic diagram illustrating an exemplary configuration of element <item> of RSS data that is generated based on the document data according to an embodiment of the present invention;

FIG. 41 is a schematic diagram illustrating an example of partial image metadata corresponding to partial image data according to an embodiment of the present invention;

FIG. 42 is a schematic diagram illustrating an exemplary configuration of element <item> of RSS data that is generated based on document data according to an embodiment of the present invention;

FIG. 44 is a schematic diagram illustrating a table included in an RSS data generating part according to an embodiment of the present invention;

FIG. 45 is a schematic diagram illustrating an example of a setting screen used for setting conditions for transmitting a combination of partial image data according to an embodiment of the present invention;

DETAILED DESCRIPTION OF THE PREFERRED EMBODIMENTS

First Embodiment

Figure 1:
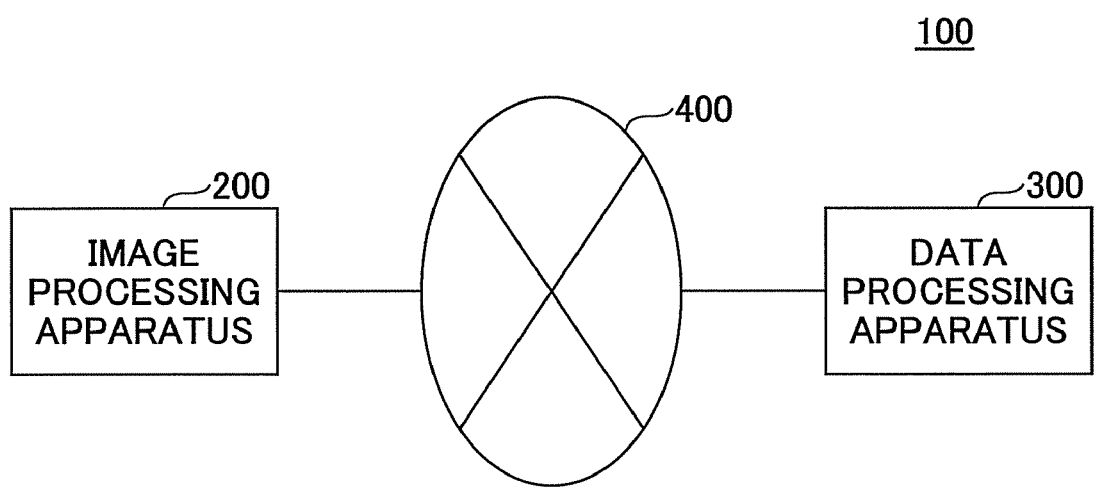
FIG. 1 illustrates an exemplary configuration of an image processing system according to an embodiment of the present invention.

FIG. 1 illustrates an exemplary configuration of an image processing system 100 according to an embodiment of the present invention. The image processing system 100 includes an image processing apparatus 200 and a data processing apparatus 300 that are connected by a network 400. The image processing apparatus 200 and the data processing apparatus 300 are configured to transmit/receive data with each other via the network 400.

The image processing apparatus 200 generates data in an RSS (Rich Site Summary/Resource Description Framework Site Summary) format and transmits the RSS data to the data processing apparatus 300 by using push-type transmission. The push-type transmission is a type of communication where transmission of data is automatically initiated by a server without any request from a user. In this embodiment, the data processing apparatus 300 acts as the user, and the image processing apparatus 200 as the server. Further, in this embodiment, RSS data are to be transmitted by using push-type transmission (push-type transmission data).

Figure 2:
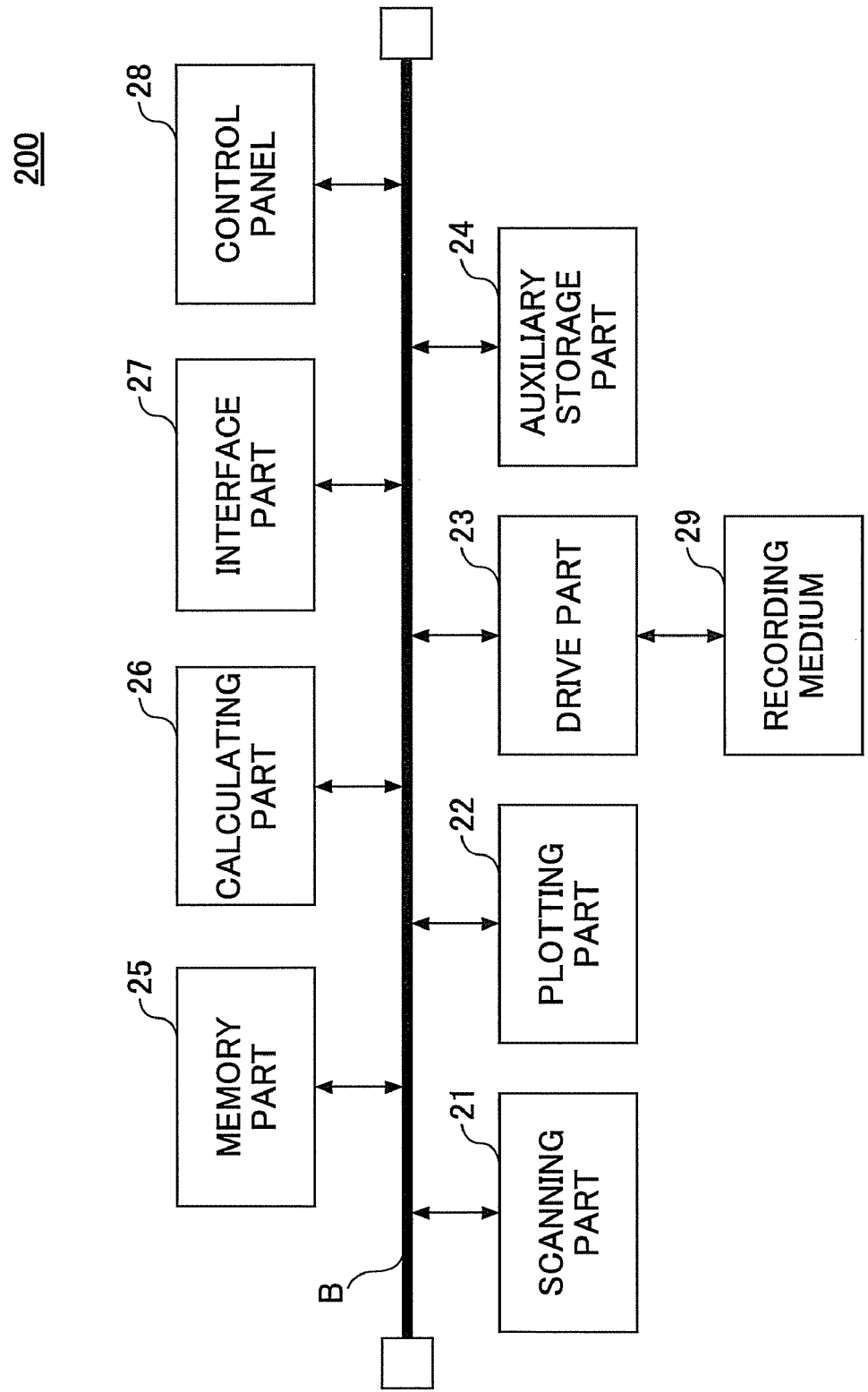
FIG. 2 is a schematic diagram illustrating a hardware configuration of an image processing apparatus according to an embodiment of the present invention.

FIG. 2 is a schematic diagram illustrating a hardware configuration of the image processing apparatus 200 according to an embodiment of the present invention. The image processing apparatus 200 includes a scanning part 21, a plotting part 22, a drive part 23, an auxiliary storage part 24, a memory part 25, a calculating part (CPU) 26, an interface part 27, and a control panel 28.

The scanning part 21 includes, for example, a scanner, a scanner engine, and an engine, control part. The scanning part 21 is for obtaining data from a document (document data) by scanning the document. The plotting part 22 includes a plotter, a plotter engine, and an engine control part. The plotting part 22 is for printing (plotting) the document data. The control panel 28 is for displaying, for example, a screen indicating the status of a process performed by the image processing apparatus 200.

The interface part 27 includes, for example, a modem or a LAN card. The interface part 27 is for connecting the image processing apparatus 200 to the network 400.

The image processing apparatus 200 may be controlled with an image processing program according to an embodiment of the present invention. For example, the image processing program may be installed from a recording medium 29 on which the image processing program is recorded or downloaded from the network 400. The recording medium 29 may be a recording medium having data optically, electrically, or magnetically recorded thereto (e.g., CD-ROM, flexible disk, MO disk) or a semiconductor memory having data electrically recorded thereto (e.g., ROM, flash memory).

In a case where the recording medium 29 is mounted on the drive part 23, the image processing program is read out from the recording medium 29 and installed in the auxiliary storage part 24 via the drive part 23. In a case where the image processing program is downloaded from the network 400, the image processing program is installed in the auxiliary storage part 24 via the interface part 27.

In addition to storing the installed image processing program, the auxiliary storage part 24 also stores, for example, necessary files and data. The memory part 25 reads out the image processing program from the auxiliary storage part 24 and temporarily stores the image processing program therein when the image processing apparatus 200 is activated. Then, the calculating part (CPU) 26 performs the below-described processes according to the image processing program stored in the memory part 25.

Figure 3:
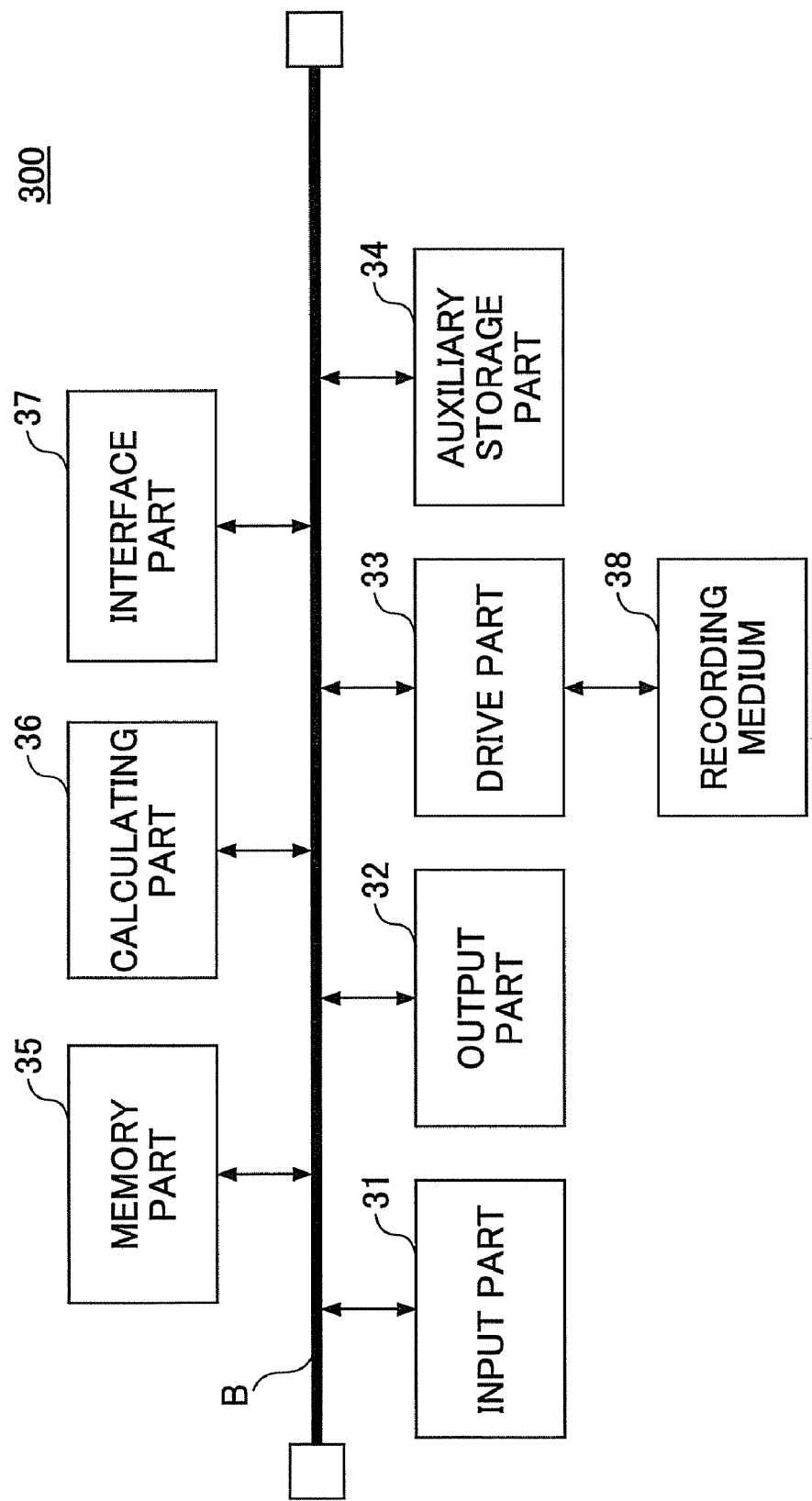
FIG. 3 is a schematic diagram illustrating a hardware configuration of a data processing apparatus according to an embodiment of the present invention.

FIG. 3 is a schematic diagram illustrating a hardware configuration of the data processing apparatus 300 according to an embodiment of the present invention. The data processing apparatus 300 may be, for example, a regular computer. The data processing apparatus 300 includes an input part 31, an output part 32, a drive part 33, an auxiliary storage part 34, a memory part 35, a calculating part 36, and an interface part 27 that are connected to each other by a bus B.

The input part 31 may be, for example, a keyboard, or a mouse. The input part 31 is for inputting various signals. The output part 32 is, for example, a display device. The output part 32 is for displaying various windows and data. The interface part 37 may be, for example, a modem or a LAN card. The interface part 37 is for connecting to the network 400.

Various data programs (including a data processing program(s)) for controlling the data processing apparatus 300 are stored in the auxiliary storage part 34. The data processing program may be, for example, installed from a distributed recording medium 38 or downloaded from the network 400. The recording medium 38 on which the data processing program is recorded may be a recording medium having data optically, electrically, or magnetically recorded thereto (e.g., CD-ROM, flexible disk, MO disk) or a semiconductor memory having data electrically recorded thereto (e.g., ROM, flash memory).

Further, in a case where the recording medium 38 on which the data processing program is recorded is mounted on the drive part 33, the data processing program is read out from the recording medium 38 and installed in the auxiliary storage part 34 via the drive part 33. In a case where the image processing program is downloaded from the network 400, the data processing program is installed in the auxiliary storage part 34 via the interface part 37.

In addition to storing the installed data processing program, the auxiliary storage part 34 also stores, for example, necessary files and data. The memory part 35 reads out the data processing program from the auxiliary storage part 34 and stores the data processing program therein when the data processing apparatus 300 is activated. Then, the calculating part (CPU) 36 performs the below-described processes according to the data processing program stored in the memory part 35.

Figure 4:
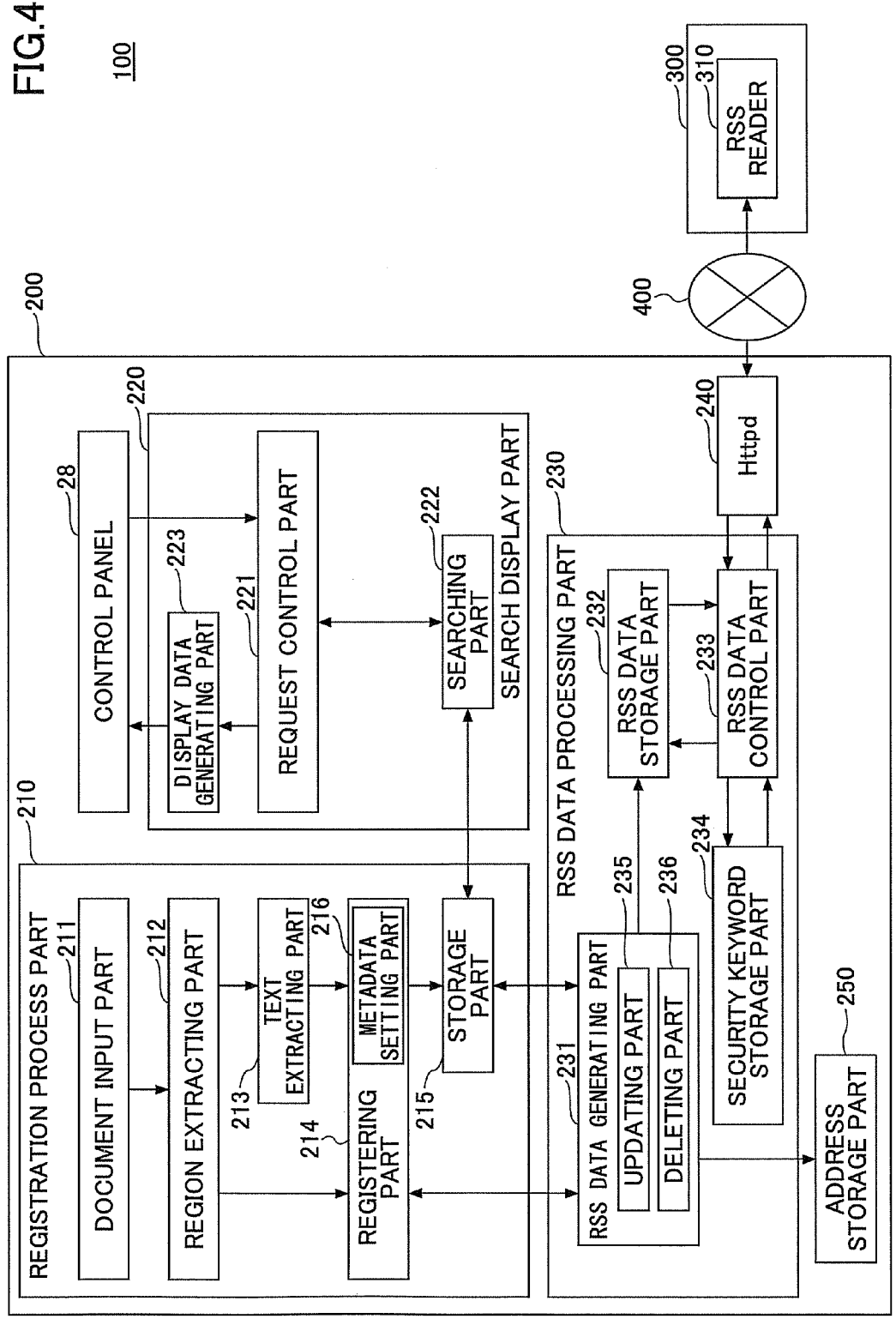
FIG. 4 is a schematic diagram for describing functions and configurations of each part or apparatus that constitute an image processing system according to an embodiment of the present invention.

FIG. 4 is a schematic diagram for describing the functions and the configurations of the parts or apparatuses that constitute the image processing system 100 according to an embodiment of the present invention.

In this embodiment, the image processing apparatus 200 includes a registration process part 210, a search display part 220, a RSS data processing part 230, a Httpd (HyperText Transfer Protocol Daemon) part 240, and an address storage part 250. The data processing apparatus 300 includes an RSS reader 310.

In this embodiment, the registration process part 210 includes a document input part 211, a region extracting part 212, a text extracting part 213, a registering part 214, and a storage part 215.

The document input part 211 is for inputting document data of a document to the image processing apparatus 200. The document input part 211 may be, for example, the scanning part (scanner) 21 that reads out an image from the document. The document input part 211 may input image data obtained from, for example, a digital camera (not illustrated) or the network 400.

The region extracting part 212 is for automatically extracting partial image data from the document data input from the document input part 211. The extracted partial image data include data indicating a region of a document containing image data (region of a document in which an image is formed), text data corresponding to a text region of a document (region of a document in which text (character string) is formed), or both. In this embodiment, the document data include a combination of data of an image (e.g., drawing or table) and data of text (character string).

The text extracting part 213 is for analyzing the configuration (structure) of the document data input from the document input part 211 and extracting the text data from the partial image data extracted by the region extracting part 212. In this embodiment, the text extracting part 213 generates page data. The page data indicate the location in which document data, partial image data, and text data are stored. For example, the page data include data identifying the image processing apparatus 200 that stores the document data, the partial image data, and the text data. Alternatively, the page data may include data identifying the storage part 215 that stores the document data, the partial image data, and the text data.

The registering part 214 associates document data, partial image data (data of the image region and data of the text region), text data, and page data and registers the associated data in the storage part 215. The registering part 214 includes a metadata setting part 216 for setting metadata of the document data. The metadata of the document data are attached to the document data. The metadata correspond to configuration data indicating the configuration of the document data.

The registering part 214 sets the metadata of the document data to be stored in the storage part 215 by using the metadata setting part 216 and registers the set metadata in the storage part 215. In this embodiment, data registered by the registering part 214 may also be hereinafter referred to as registration data. When the registering part 214 completes registering the registration data in the storage part 215, the registering part 214 reports to the RSS data processing part 230 that new registration data have been stored in the storage part 215.

The storage part 215 stores the registration data registered by the registering part 214 and outputs the registration data in response to a search request from the search display part 220 or the RSS data processing part 230. The storage part 215 may be provided in, for example, the auxiliary storage part 24 of the image processing apparatus 200. Alternatively, the storage part 215 may be a storage device of a document registration server connected to the network 400.

The search display part 220 includes a request control part 221, a search part 222, and a display data generating part 223. For example, data indicating various controls and maneuvers (control data) performed on the control panel 28 are input to the search display part 220. The control data may include requests for searching for registration data stored in the storage part 215.

The search display part 220 causes the control panel 28 to display data obtained from the storage part 215. The data obtained from the storage part 215 are obtained from registration data.

The request control part 221 sends various requests (e.g., a request requesting the search part 222 to search for data) based on the control data input from the control panel 28. The request control part 221 sends data received from the search part 222 to the display data generating part 223.

The search part 222 searches for data in the storage part 215 based on a request from the request control part 221 and sends the data obtained by the search (search result) to the request control part 221.

The display data generating part 223 receives the data from the request control part 221 and generates display data based on the received data. The display data are to be displayed on the control panel 28.

In this embodiment, the RSS data process part 230 includes an RSS data generating part 231, an RSS data storage part 232, an RSS data control part 233, and a security keyword storage part 234.

The RSS data generating part 231 refers to registration data stored in the storage part 215 and generates RSS data. The RSS data are transmitted to the data processing part 300 by using type transmission. In this embodiment, the RSS data generating part 231 includes an updating part 235 and a deleting part 236. The deleting part 236 generates RSS data indicating deletion of registration data.

The RSS data storage part 232 stores RSS data generated by the RSS data generating part 231.

The RSS data control part 233 controls the push-type transmission of RSS data performed with respect to the Httpd part 240. The security keyword storage part 234 stores a list of security keywords.

In this embodiment, the Httpd part 240 controls the communication performed between the image processing apparatus 200 and the RSS reader 310 of the data processing apparatus 300. The address storage part 250 stores address data therein. The address data are data registered beforehand, for example, by the administrator or the user of the image processing system 100.

In this embodiment, the RSS reader 310 is included in the data processing apparatus 300. The RSS reader 310 performs processes for reading RSS data via the network 400. The RSS reader 310 includes a function of periodically accessing the image processing apparatus 200 and automatically downloading RSS data generated by the image processing apparatus 200 at predetermined periods (intervals). Whenever RSS data are updated, the RSS reader 310 can inform the user of the update by displaying a link to an article corresponding to the updated RSS data.

Although the image processing system 100 of this embodiment is configured to include the image processing apparatus 200 and the data processing apparatus 300, the image processing system 100 is not limited to such configuration. For example, in one case, the image processing system 100 may be configured to include the registration process part 210, the search display part 220, the RSS data processing part 230, the Httpd part 240, and the address storage part 250. In this case, the RSS reader 310 is provided outside the image processing system 100. In another case, the image processing apparatus 200 may be connected to plural data processing apparatuses 300.

Figure 5:
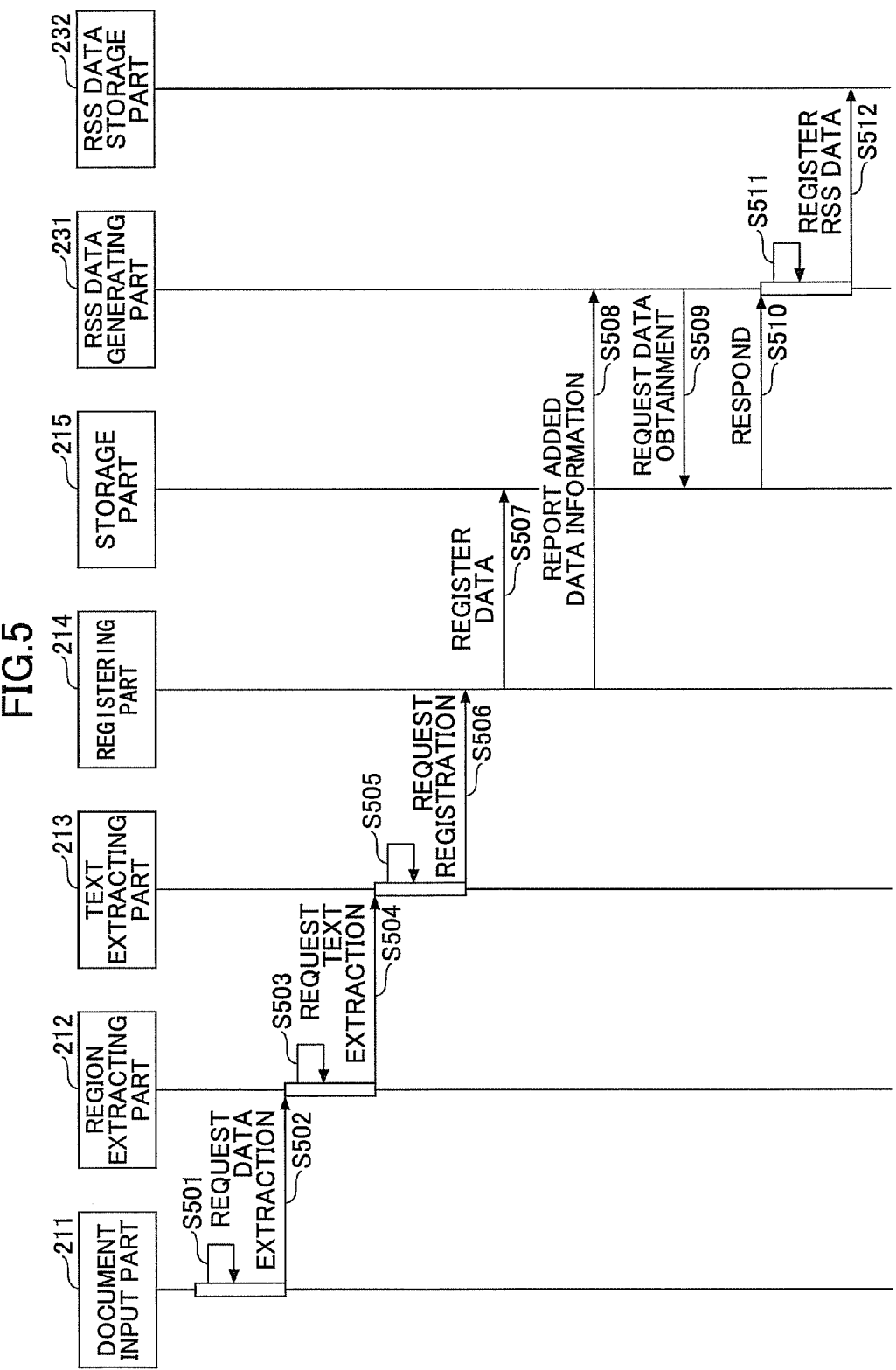
FIG. 5 is a sequence diagram illustrating an operation of an image processing apparatus according to an embodiment of the present invention.

Next, an operation of the image processing apparatus 200 according to an embodiment of the present invention is described with reference to FIG. 5. FIG. 5 is a sequence diagram illustrating an operation of the image processing apparatus 200 according to an embodiment of the present invention.

In the image processing apparatus 200 of this embodiment, the document input part 211 inputs document data (Step S501). When the document data are input, the document input part 211 requests the region extracting part 212 to extract data in the document data (Step S502). The region extracting part 212, having received the request for data extraction, extracts partial image data of an image region and partial image data of a text region from the document data (Step S503). Then, the region extracting part 212 requests the text extracting part 213 to extract the text data from the text region of the partial image data (Step S504).

Along with extracting text data from the text region of the partial image data, the text extracting part 213 generates page data (Step S505). Then, the text extracting part 213 sends a request for registration of data to the registering part 214 (Step S506). Having received the registration request, the registering part 214 associates the document data, the partial image data, the text data, the metadata, and the page data with each other and registers the associated data as registration data in the storage part 215 (Step S507). Further, the registering part 214 reports that new registration data (added data) are to be stored to the RSS data generating part 231 (Step S508).

Then, in order to generate RSS data, the RSS data generating part 231 accesses the storage part 215 and requests obtainment of registration data (Step S509). Having received the data obtainment request, the storage part 215 sends the requested registration data to the RSS generating part 231 (Step S510).

Having received the registration data from the storage part 215, the RSS data generating part 231 generates RSS data (Step S511). Then, the RSS data generating part 231 registers the generated RSS data in the RSS data storage part 232 (Step S512). Details of processes performed by the RSS data generating part 231 are described below.

Figure 6:
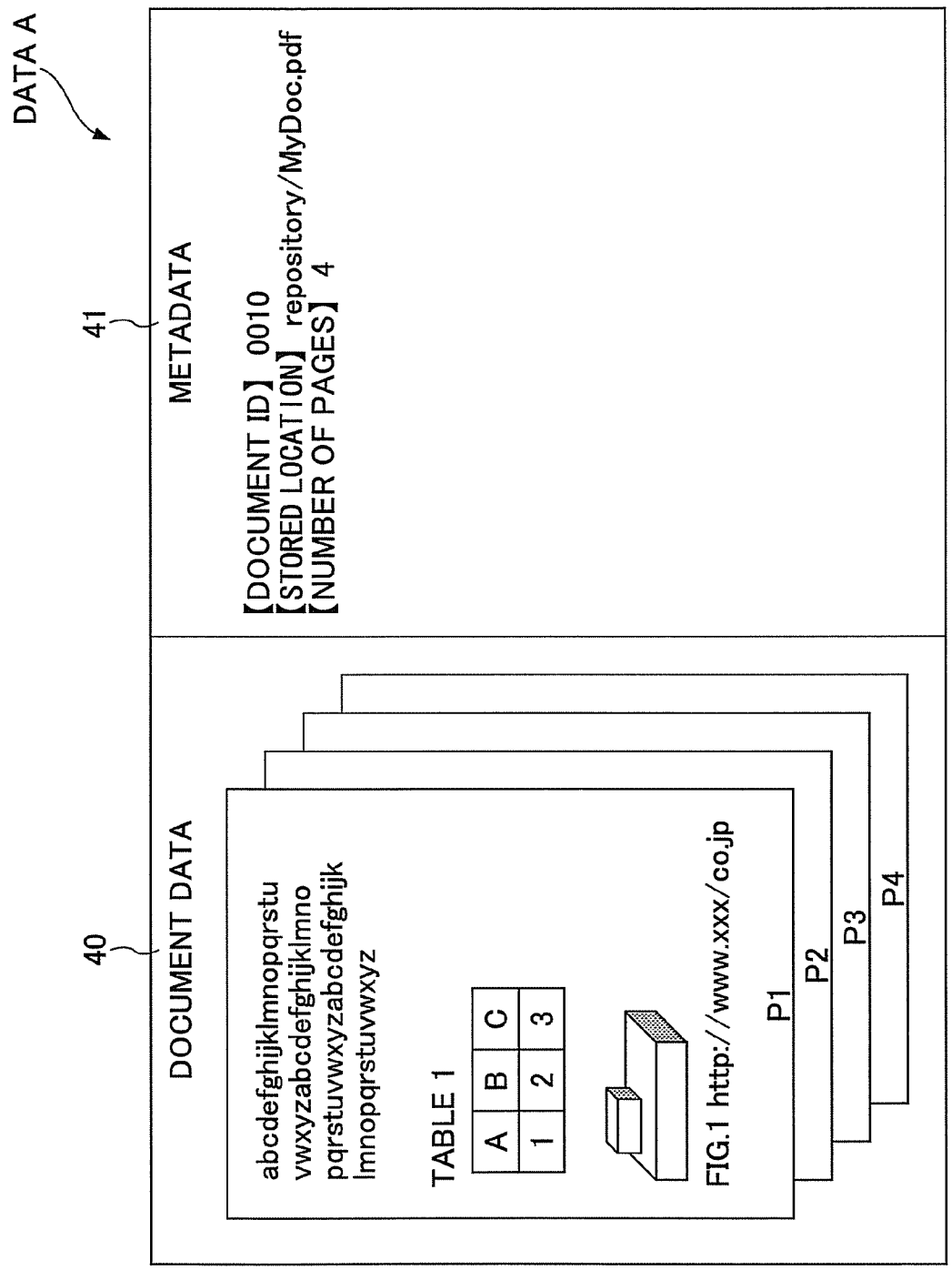
FIG. 6 is a schematic diagram for describing document data and metadata stored in a storage part according to an embodiment of the present invention.
Figure 7:
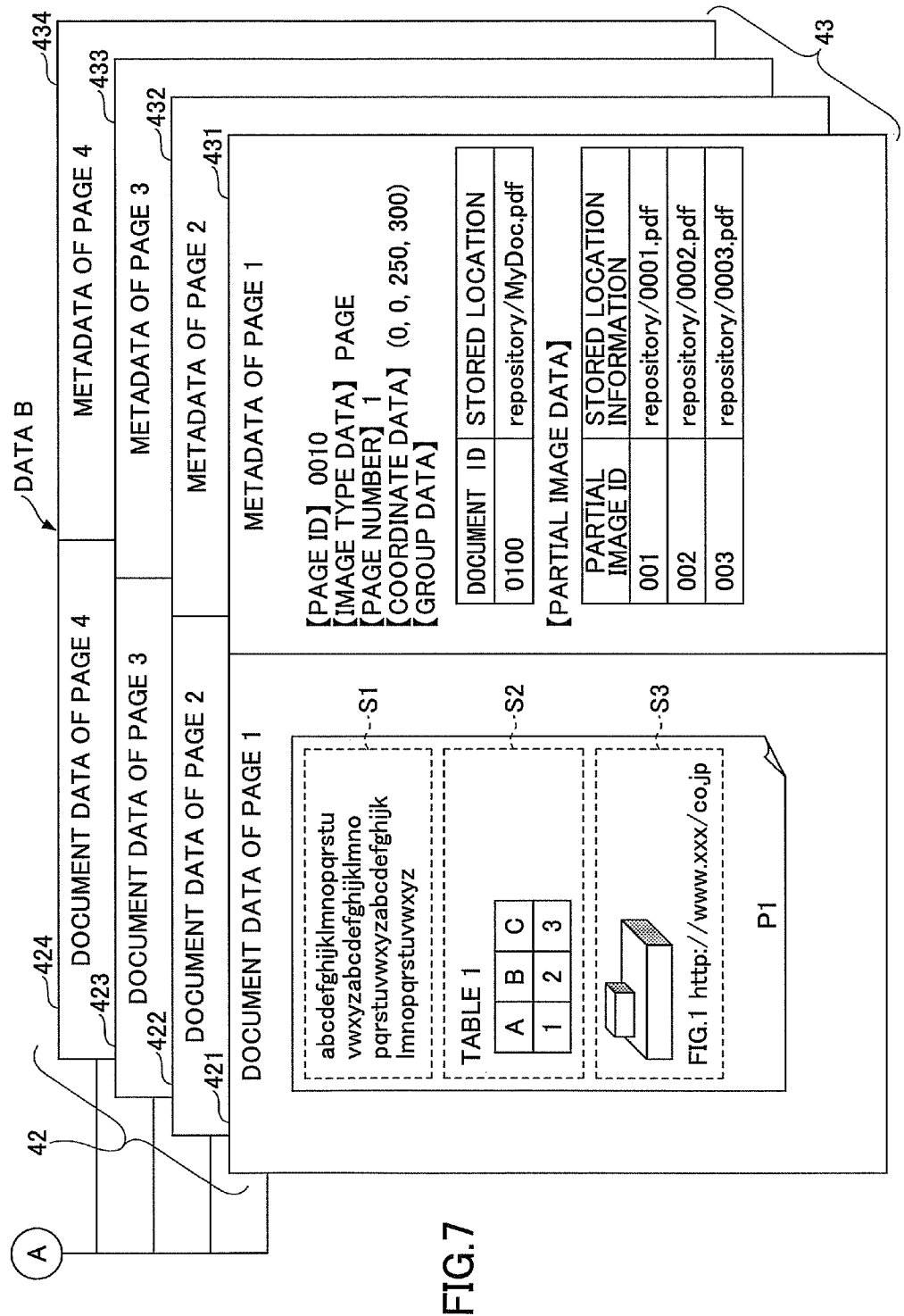
FIG. 7 is a schematic diagram for describing page-per-page data of the metadata according to an embodiment of the present invention.
Figure 8:
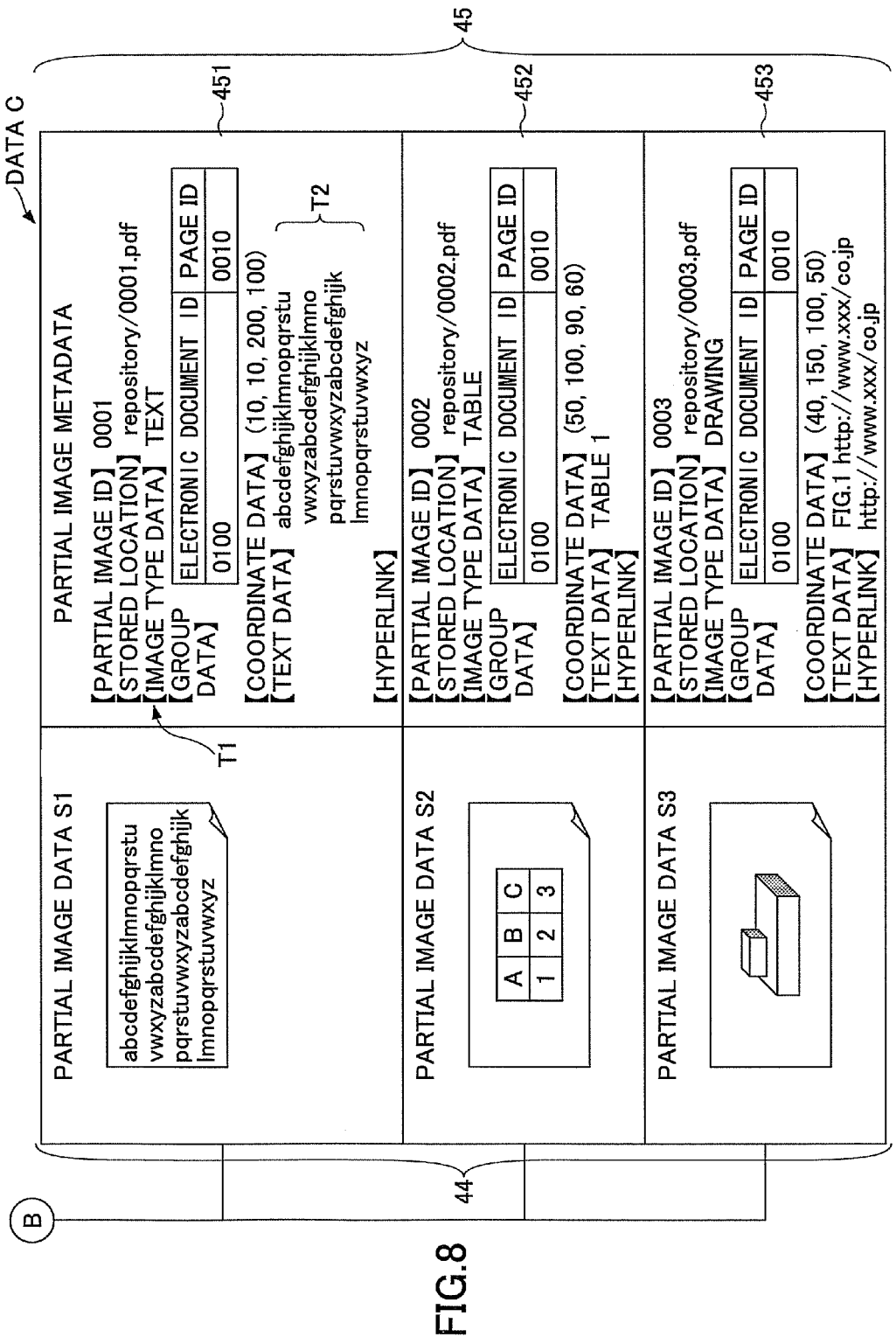
FIG. 8 is a schematic diagram for describing partial image data and metadata corresponding to the partial image data according to an embodiment of the present invention.

Next, registration data are described with reference to FIGS. 6-8. The data illustrated in FIGS. 6-8 are data stored in the storage part 215 by performing the processes of Steps S501 through S507 of FIG. 5. The data illustrated in FIGS. 6-8 are examples that constitute registration data. For example, data A of FIG. 6, data B of FIG. 7, and data C of FIG. 8 are associated with each other.

FIG. 6 is a schematic diagram for describing document data and meta data stored in the storage part 215. The storage part 215 of this embodiment stores data A including document data 40 (input by the document input part 211) and metadata 41 associated with the document data 40.

The document data 40 of this embodiment includes data input by the document input part 211 in Step S501. The document data 40 of this embodiment may include, for example, document data of a document containing plural pages as illustrated in FIG. 6. The document data 40 of this embodiment may be document data 40 corresponding to a single unit of data read out from a document by scanning the document once with the scanning part 21. For example, in a case where a document of four pages is scanned according to a single scanning command, the data amounting to four pages may be handled as a single unit of document data 40.

The metadata 41 include data attached to the document data 40. The metadata 41, may be, for example, stored location data (e.g., data indicating document ID of the document data 40 or the location of document ID) or page number data (data indicating the number of pages of the document data 40). The metadata 41 may be set in correspondence with the document data by the metadata setting part 216 when the registering part 214 registers (stores) the document data 40 in the storage part 215.

Although the items included in the metadata 41 in FIG. 6 are the document ID, the stored location of the document data 40, and the number of pages of the document data 40, the items included in the metadata 41 are not limited to the items illustrated in FIG. 6. For example, the metadata 41 may include the title of the document data, the author of the document data, or the date on which the document data have been input.

FIG. 7 is a schematic diagram for describing page-per-page data (page data corresponding to each page) of the document data 40 and page-per-page data (page data corresponding to each page) of the metadata 41 according to an embodiment of the present invention.

The storage part 215 stores data B associated with data A of FIG. 6. The data B include document data corresponding to each page of the document data (hereinafter also referred to as "page document data") 42 and metadata corresponding to each page of the document data (hereinafter also referred to as "page metadata").

The document data 40 in this embodiment include page document data 42 equivalent to four pages. Accordingly, the page document data 42 include document data 421 corresponding to the first page, document data 422 corresponding to the second page, document data 423 corresponding to the third page, and document data 424 corresponding to the fourth page. Further, the page metadata 43 include metadata 431 of the document data 421, metadata 432 of the document data 422, metadata 433 of the document data 423, and metadata 434 of the document data 424.

The data B of this embodiment are generated by the process of Step S503 performed by the region extracting part 212. Therefore, partial image data of the image region and partial image data of the text region are identified in the page document data 42 of data B. Further, the page metadata includes, for example, coordinate data indicating the coordinates of the image region and the text region, and partial image data indicating information regarding of the partial image data. The partial image data of the metadata include a partial image ID associated with stored location data. The partial image ID serves to identify corresponding partial image data. The stored location data indicate the location in which corresponding partial image data are stored.

For example, in the document data 421 of FIG. 7, partial image data S1, S2, and S3 are identified. Further, in this example, the metadata 431 corresponding to the document data 421 include the partial image ID identifying the partial image data S1 and the stored location data of the partial image data S1. The same applies to the metadata corresponding to the partial image data S2 and S3.

FIG. 8 is a schematic diagram for describing partial image data and metadata corresponding to the partial image data according to an embodiment of the present invention.

The storage part 215 of this embodiment stores data C associated with data B of FIG. 7. The data C page partial image data 44 include a page partial image data part 44 and a page metadata part 45 corresponding to the page partial image data part 44. The page partial image data 44 are extracted from the page document data 42 of the document data 40. The data C are generated after the process of Step S505 is completed by the text extracting part 213.

The page metadata 45 include image type data which indicate the image type of the page partial image data 44. The image type may be, for example, "text", "image", "table", or "drawing". In this embodiment, the image type of the partial image data recognized (determined) to be the text region is "text", and the image type of the partial image data recognized (determined) to be the image region is one of "image", "table", or "drawing".

In a case where the image type data are "text", the page metadata 45 include metadata text corresponding to data extracted from the partial image data. Even in a case where the image type data are not "text", text data are extracted in a case where the text data are contained in the partial image data. The extracted text data are contained in the page metadata 45.

In FIG. 8, the data C are configured to have partial image data S1, S2, S3 included in the page partial image data extracted from the document data 421 and partial image metadata 451, 452, 453 included in the page metadata 45.

The partial image metadata 451 correspond to the partial image data S1. The partial image metadata 452 correspond to the partial image data S2. The partial image metadata 453 correspond to the partial image data S3.

Image type data T1 of the partial image data S1 are included in the partial image metadata 451. The image type data T1 indicate that the image type of the partial image data S1 is "text". Accordingly, the partial image metadata 451 include text data T2 in the partial image data S1.

The image type data of the partial image metadata 452 indicate that the type of image of the partial image data S2 is "table". The partial image metadata 452 include the title of the table "Table 1" as the text data of the partial image data S2.

The image type data of the partial image metadata 453 indicate that the type of image of the partial image data S3 is "drawing". The partial image metadata 453 include the title of the drawing (which is included as the text data of the partial image data S3) and a hyperlink indicating the link destination of the partial image data S3.

As described above, registration data in this embodiment include the data A, B, and C that are associated with each other. In this embodiment, the data A include document data 40 and metadata corresponding to the document data 40. In this embodiment, the data B include page document data 42 included in the document data 40 and page metadata 43 corresponding to the page document data 42. In this embodiment, the data C include page document data part 44 recognized in each page of the page document data 42 and page metadata part 45 corresponding to the page document data part 44.

Figure 9:
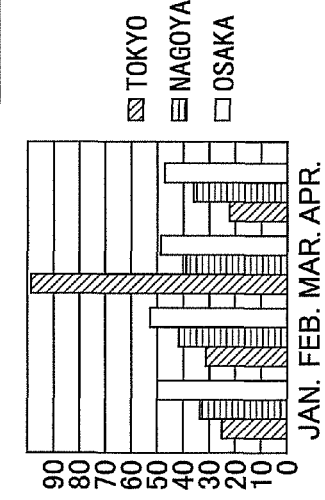
FIG. 9 is a first schematic diagram illustrating registration data according to an embodiment of the present invention.

Next, an example of registration data 90 according to an embodiment of the present invention is described with reference to FIGS. 9 and 10. FIG. 9 is a first schematic diagram illustrating registration data 90. FIG. 10 is a second schematic diagram illustrating the registration data 90.

FIG. 9 depicts the registration data 90 including document data 91 and metadata 92 corresponding to the document data 91.

FIG. 10 depicts the registration data 90 including page partial document data 93 and page partial image metadata 94 that are associated with the document data 91 and the metadata 92. The page partial image document data include partial image data 931 and 932. The page partial image metadata 94 include partial image metadata 941 and 942. The partial image metadata 941 are metadata of the partial image data 931. The partial image metadata 942 are metadata of the partial image data 932.

Next, generation of RSS data with the RSS data generating part 231 according to an embodiment of the present invention is described. The RSS data generating part 231 generates RSS data by performing the operations illustrated in FIGS. 11-14.

FIG. 11 is a flowchart illustrating an exemplary operation of extracting text data from registration data 90 with the RSS data generating part 231. In FIG. 11, in a case where the image type of the partial image data is "text", the text data extracted from the partial image data are set as a description part of RSS data.

The RSS data generating part 231 confirms a partial image region of the metadata 92 of the document data 91 (Step S1101). For example, the RSS data generating part 231 refers to the metadata 92 stored in the storage part 215 and confirms the number of partial image data parts included in the document data 91 and the stored location of the partial image data part(s).

Then, the RSS data generating part 231 confirms the page partial image metadata 94 of the document data 91 (Step S1102). Then, the RSS data generating part 231 determines whether the image type of the corresponding partial image data is text or a type other than text by referring to the confirmed page partial image metadata 94 (Step S1103). For example, the RSS data generating part 231 confirms the image type of the partial image metadata parts 941, 942 included in the page partial image metadata 94 and searches for partial image data having text as its image type.

In a case where the image type of the partial image data is a type other than text, the RSS data generating part 231 determines whether all of the partial image metadata included in the page partial image metadata 94 have been searched (Step S1104). In a case where not all of the partial image metadata have been searched (No in Step S1104), the RSS generating part 231 returns to Step S1102 to repeat the above-described processes. In a case where all of the partial image metadata have been searched (Yes in Step S1104), the operation of the RSS data generating part 231 is completed.

In a case where the image type of the partial image data is text (Yes in Step S1103), the RSS data generating part 231 obtains text data according to the partial image metadata 942 (Step S1105).

Then, the RSS data generating part 231 sets the obtained text data as the value of a sub-element <description> of element <item> of RSS data (Step S1106) and proceeds to Step S1104. It is to be noted that the term "element" of RSS data may also be referred to as a "tag" of RSS data.

Figure 12:
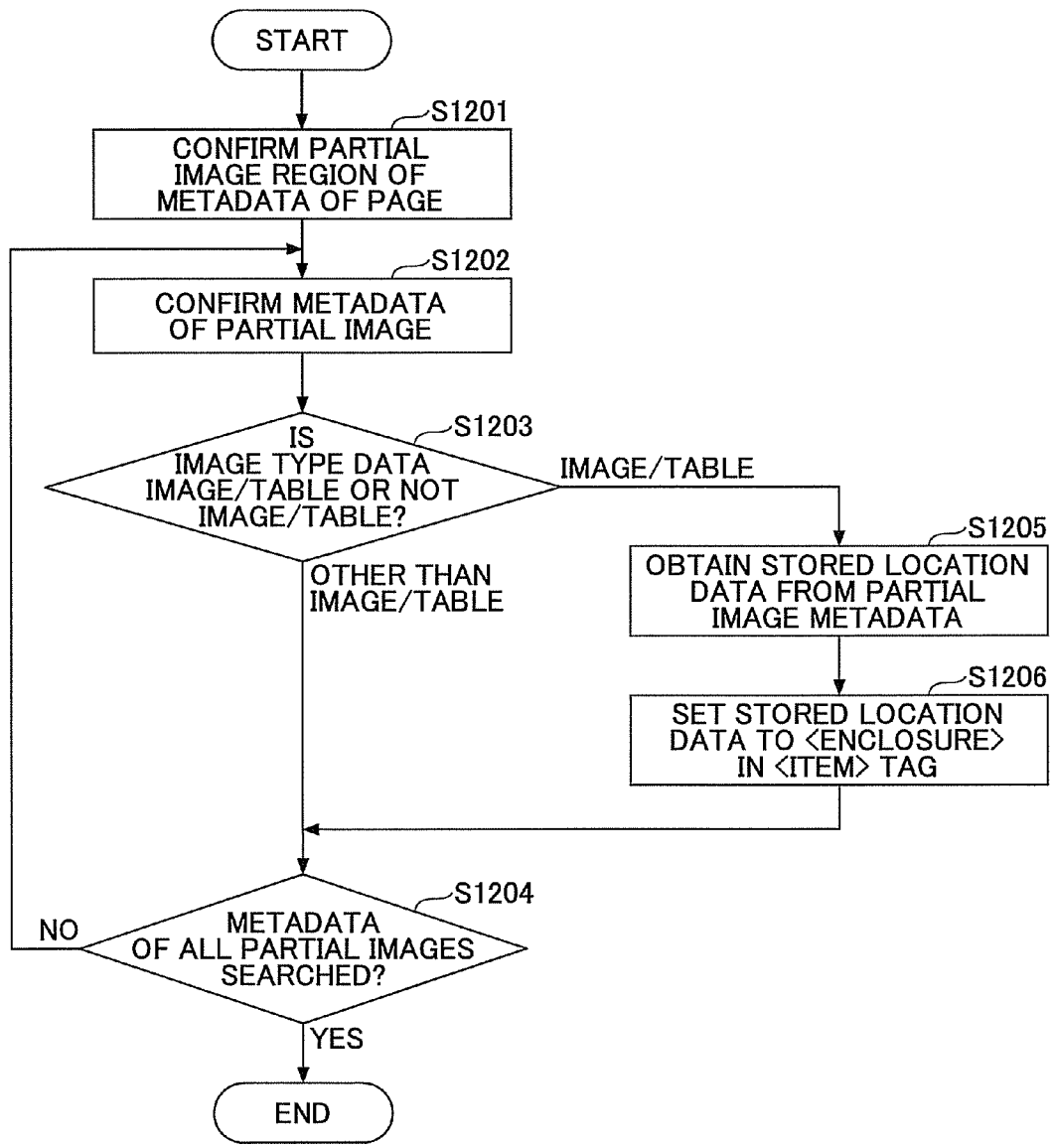
FIG. 12 is a flowchart for describing an operation of setting a stored location of partial image data with an RSS data generating part according to an embodiment of the present invention.

Next, setting of stored location data of partial image data with the RSS data generating part 231 is described with reference to FIG. 12. FIG. 12 is a flowchart for describing an operation of setting a stored location of partial image data with the RSS data generating part 231 according to an embodiment of the present invention.

In FIG. 12, in a case where the image type of the partial image data is either "table" or "drawing", the stored location of the partial image data is set as a media object (sub-element <enclosure> of element <item>) of RSS data.

Because the processes performed in Steps S1201 and S1202 of FIG. 12 are substantially the same as those of Steps S1101 and S1102 of FIG. 11, explanation thereof is omitted.

The RSS data generating part 231 determines whether the image type of the partial image data is "image", "table" or neither "image" nor "table" (Step S1203). For example, the RSS data generating part 231 confirms the image type of the partial image data part(s) in the page partial image metadata 94 and searches for an image type of either the "drawing" or "table".

In a case where the image type is neither "image" nor "table", the RSS data generating part 231 determines whether all of the partial image metadata included in the page partial image metadata 94 have been searched (Step S1204). In a case where not all of the partial image metadata have not been searched (No in Step S1204), the RSS data generating part 231 returns to Step S1202 to repeat the above-described processes. In a case where all of the partial image metadata have been searched (Yes in Step S1204), the operation of the RSS data generating part 231 is completed.

In a case where, the image type of the partial image data is at least one of "image" or "table" (IMAGE/TABLE in Step S1203), the RSS data generating part 231 obtains stored location data from the partial image metadata (Step S1205).

Then, the RSS data generating part 231 sets the obtained stored location data as the value of a URL (Uniform Resource Locator) attribute of a sub-element <enclosure> of element <item> (Step S1206) and proceeds to Step S1204.

Thus, in this embodiment, in a case where the image type of partial image data is detected (determined) as "image" or "table", data are obtained from a stored location of a corresponding partial image metadata and are set to be a URL attribute of a sub-element <enclosure> of element <item> of the RSS data.

Figure 13:
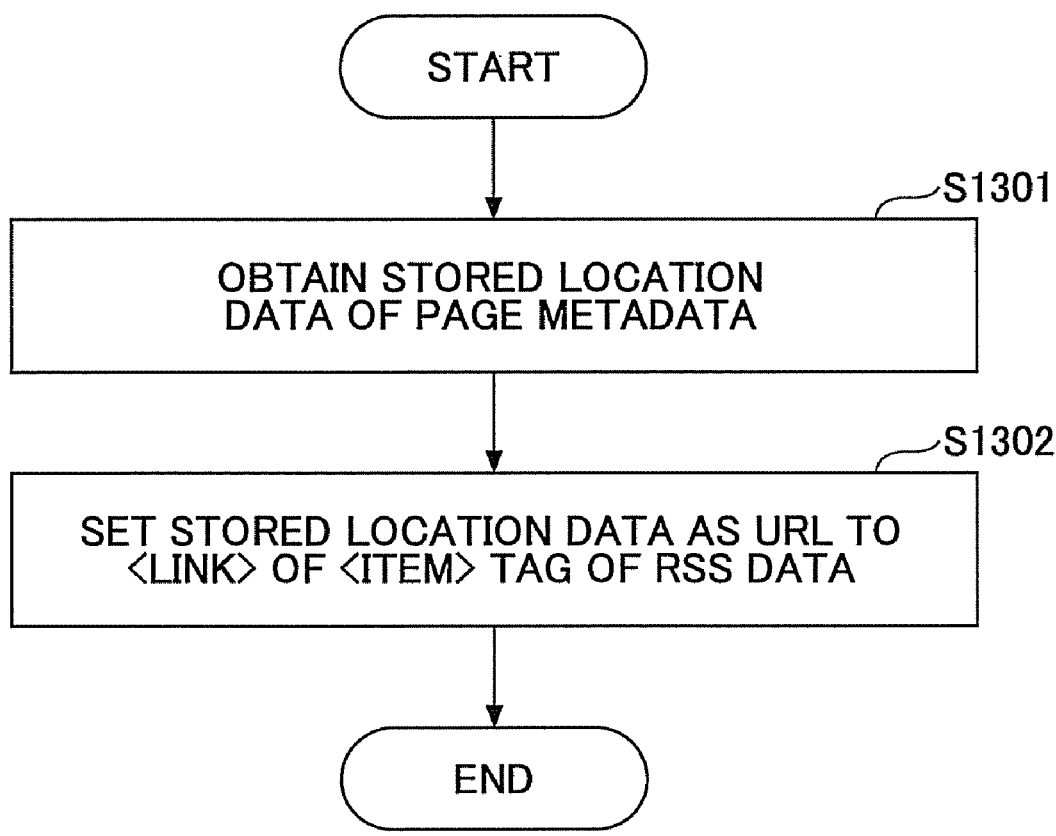
FIG. 13 is a flowchart for describing a URL extracting operation with an RSS data generating part according to an embodiment of the present invention.

Next, an operation of extracting a URL with the RSS generating part 231 according to an embodiment of the present invention is described with reference to FIG. 13. FIG. 13 is a flowchart for describing a URL extracting operation with the RSS data generating part 231 according to an embodiment of the present invention.

The RSS data generating part 231 obtains stored location data of the document data 90 from corresponding metadata 92 of the document data 90 (Step S1301). The stored location data of the document data 90 indicate the location where the document data 90 is stored.

Then, the RSS data generating part 231 sets the stored location data of the document data 90 as the URL to the value of a sub-element <link> of element <item> of the RSS data.

In a case where the image processing apparatus 200 has a user authentication function, the RSS data generating part 231 of this embodiment may add the name of the user to the RSS data.

For example, in a case where the image processing apparatus 200 performs user authentication on input user data when performing a document data input operation, input user data are sent from the document input part 211 to the storage part 215. Then, the user data are registered along with corresponding metadata in the registration data of the storage part 215. The user data may be, for example, user ID.

For example, in the registration data 90, "DocumentCriperUserA" is stored as a user ID in the item "user" of the metadata 92. Likewise, a user ID is stored in each of the partial image metadata 941 and 942.

Figure 14:
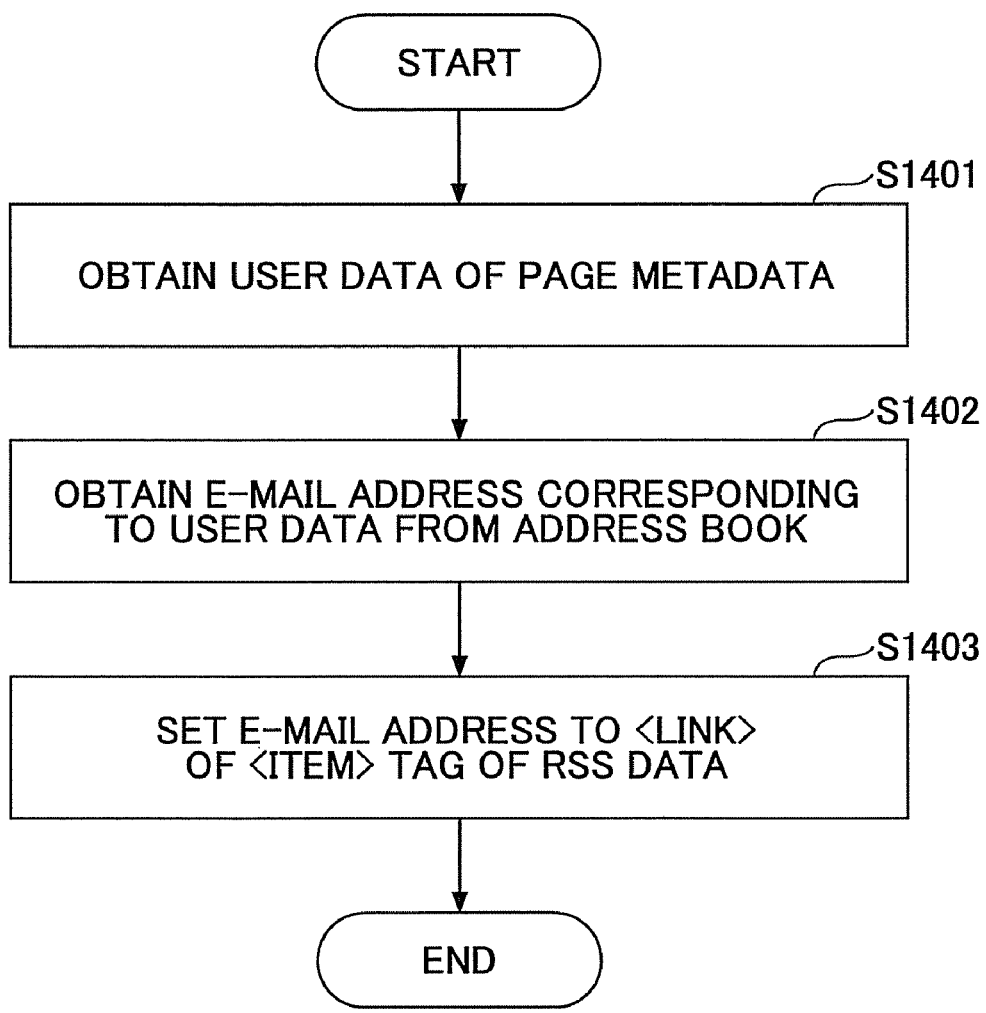
FIG. 14 is a flowchart for describing an operation of setting an e-mail address with an RSS data generating part according to an embodiment of the present invention.

Next, an operation of setting an e-mail address with the RSS data generating part 231 according to an embodiment of the present invention is described with reference to FIG. 14. FIG. 14 is a flowchart for describing an operation of setting an e-mail address with the RSS data generating part 231.

The RSS data generating part 231 obtains data indicating the user of the metadata 92 (user data) (Step S1401). More specifically, the RSS data generating part 231 obtains a user ID described in "user" in the metadata 92 of the storage part 215.

Then, the RSS data storage part 231 obtains an e-mail address corresponding to the user data from an address book (Step S1402). More specifically, the RSS data generating part 231 accesses an address storage part 250, designates the user ID from the addresses stored in the address storage part 250, and obtains an e-mail address corresponding to the user ID.

Then, the RSS data generating part 231 sets the e-mail address to be a value of element <managingEditoe> of the RSS data (Step S1403).

Next, an example of RSS data generated by having the RSS data generating part 231 perform the operations of FIGS. 11-14 on the registration data 90 is described.

FIG. 15 is a schematic drawing illustrating an exemplary configuration of RSS data.

FIG. 15 illustrates RSS data 150 generated from the registration data 90. The RSS data 150 are stored in the RSS data storage part 232.

In this embodiment, the RSS data 150 include the text data 151 extracted by the operation of FIG. 11, the URL 152 set by the operation of FIG. 12, the stored location data 153 set by the operation of FIG. 13, the user ID 154 indicating the user that input the document data 90, and the e-mail address 155 set by the operation of FIG. 14.

In this embodiment, whenever new document data are input from the document input part 211, the RSS data generating part 231 performs the operations of FIGS. 11-14 and generates RSS data. The generated RSS data are added as a new element <item>.

In a case where RSS data are newly added to the RSS data illustrated in FIG. 15, the new RSS data are added by inserting a new element <item> into the position indicated with an arrow 156 in FIG. 15.

FIG. 16 is a schematic diagram illustrating an example of new RSS 160 data which are to be added to RSS data.

The new RSS data 160 are to be added to a position between the line of </item> and the line of </channel> as indicated by the arrow 156 of FIG. 15. As illustrated in FIG. 16, the new RSS data are interposed between the tag <item> and the tag </item>.

Next, an operation of transmitting (broadcasting) RSS data with the image processing system 100 according to an embodiment of the present invention is described with reference to FIG. 17. FIG. 17 is a sequence diagram for describing an operation of transmitting RSS data with the image processing system 100.

In the image processing system 100, the RSS reader 310 of the data processing apparatus 300 transmits an RSS request to the Httpd part 240 of the image processing apparatus 200 (Step S1701). When the Httpd part 240 receives the RSS request, the Httpd part 240 sends an RSS data obtainment request to the data control part 233 of the RSS data processing part 230 (Step S1702). When the RSS data control part 233 receives the RSS data obtainment request, the RSS data control part 233 sends an RSS data obtainment request to the RSS data storage part 232 (Step S1703).

The RSS data storage part 232 transmits RSS data requested by the RSS data control part 233 to the RSS data control part 233 (Step S1704). The RSS data control part 233 transmits the RSS data received from the RSS data storage part 232 to the Httpd part 240 (Step S1705). The Httpd part 240 transmits the RSS data received from the RSS data control part 233 to the RSS reader 310 (Step S1706).

Hence, with the above-described embodiment, push-type transmission of RSS data using the RSS reader 310 is achieved.

Figure 18:
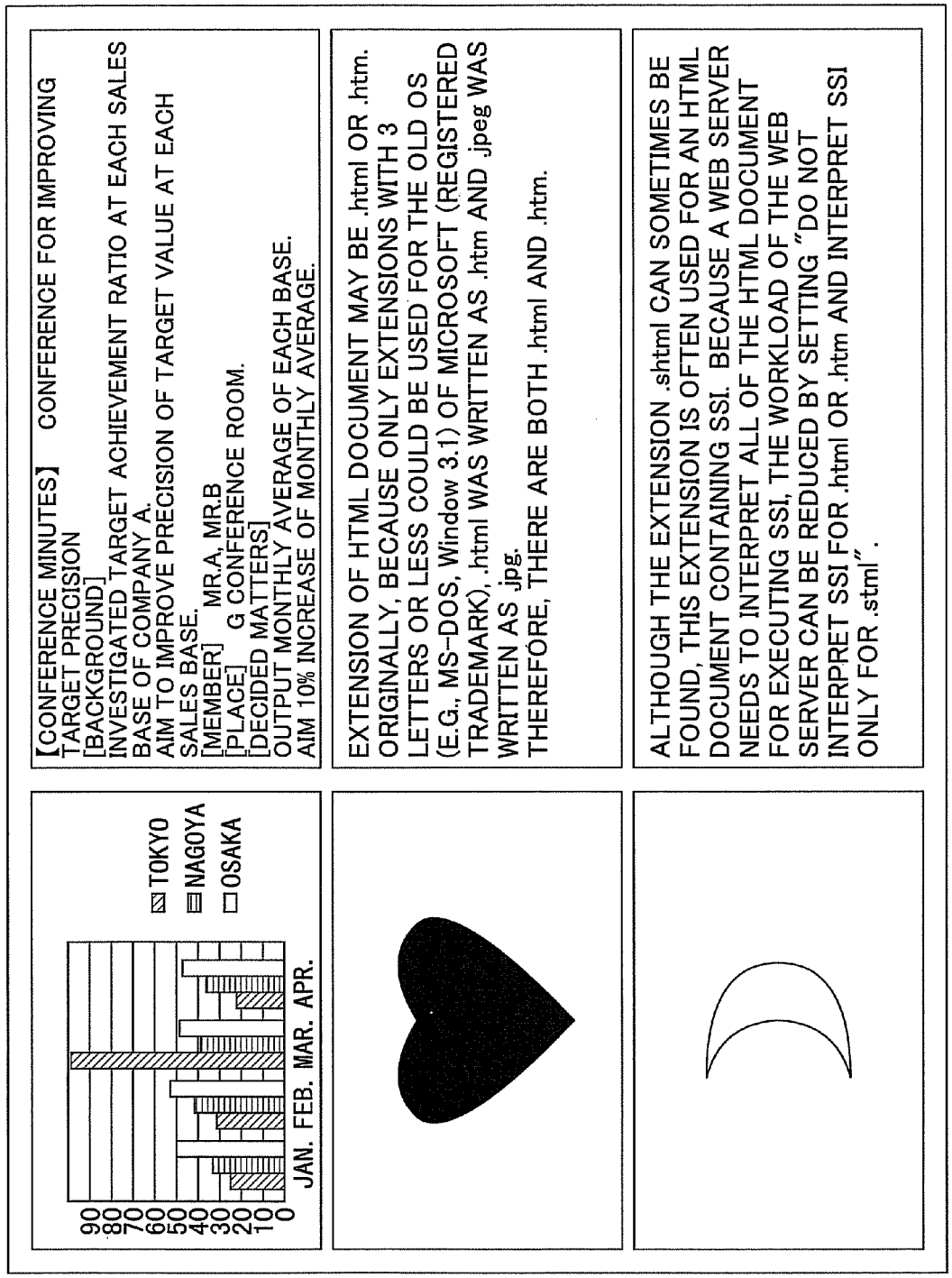
FIG. 18 is a schematic diagram of RSS data having been read out according to an embodiment of the present invention.
Figure 20:
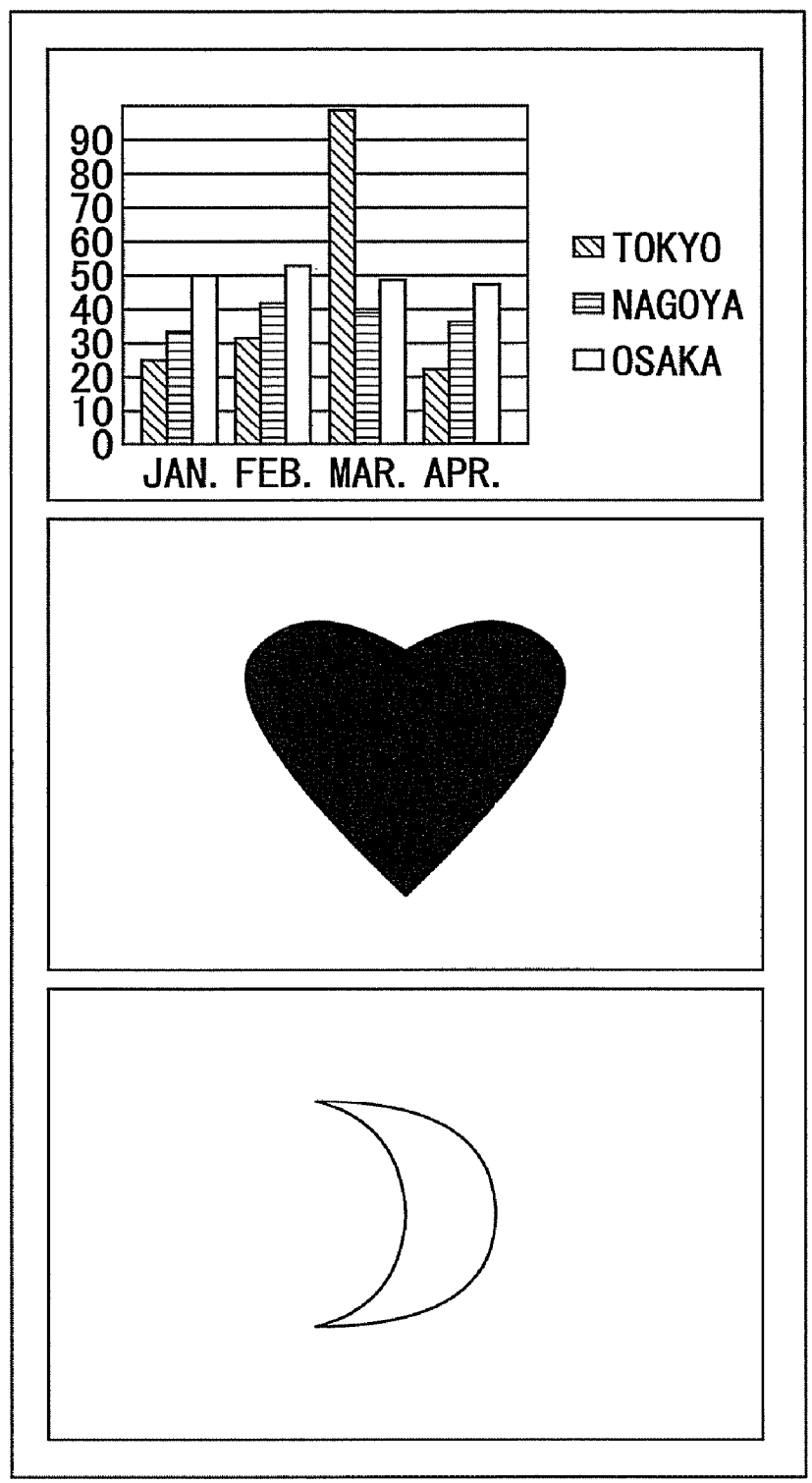
FIG. 20 is a schematic diagram illustrating an example of partial image data of RSS data having been read out according to an embodiment of the present invention.

FIGS. 18-20 illustrate an example of RSS data read by the RSS reader 310 according to an embodiment of the present invention.

FIG. 18 is a schematic diagram of RSS data (including text data and partial image data (e.g., table, image) having been read out (recognized). FIG. 19 is a schematic diagram illustrating an example of the text data of the RSS data having been read out (recognized). FIG. 20 is a schematic diagram illustrating an example of the partial image data (e.g., table, image) of the RSS data having been read out (recognized).

Next, exemplary operations of the image processing apparatus 200 are described in a case where the image processing apparatus 200 receives a request to update (change) registration data. In one operation, the request received by the image processing apparatus 200 is to update the partial image data of the registration data stored in the storage part 215.

Figure 21:
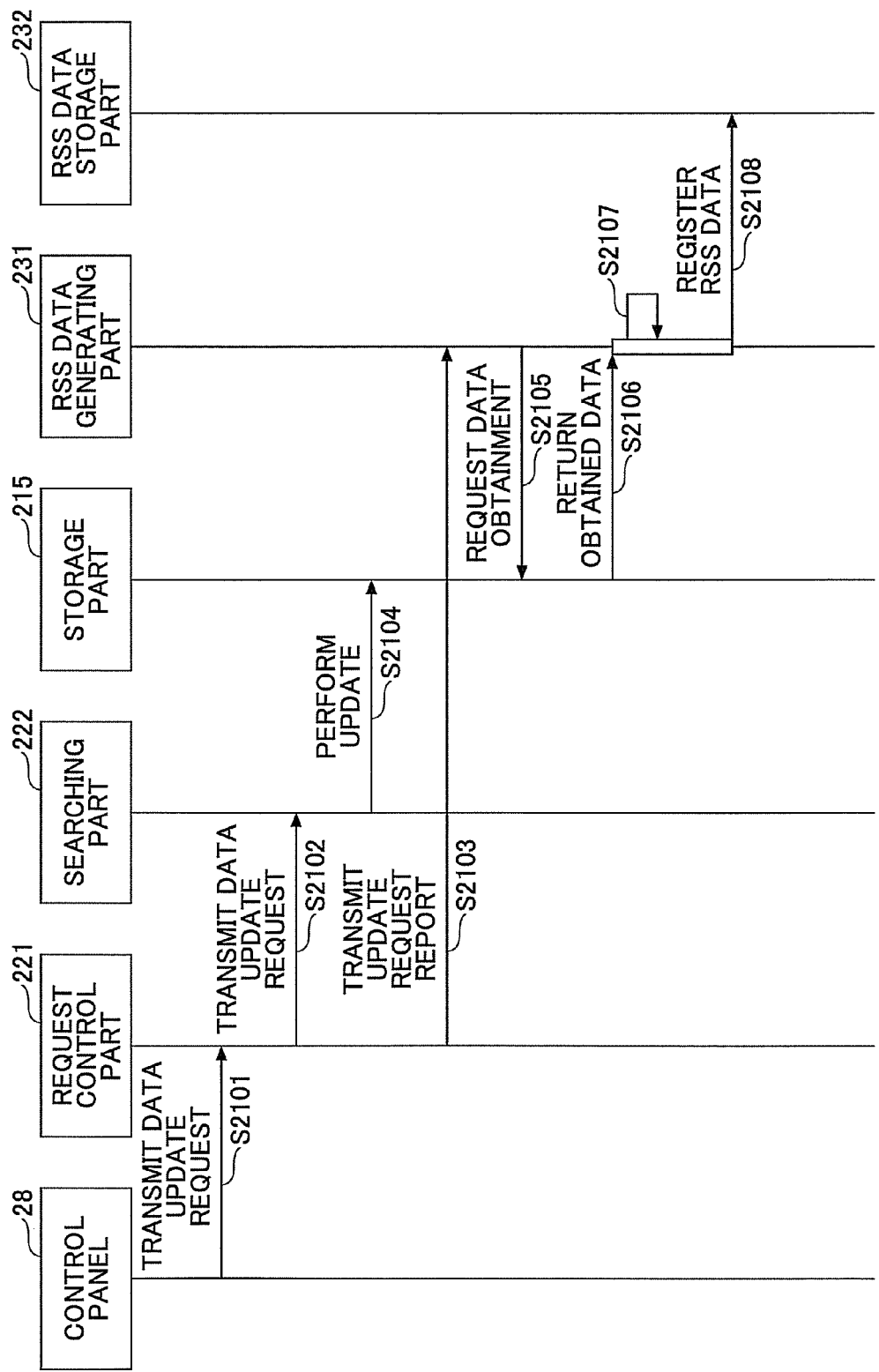
FIG. 21 is a sequence diagram for describing an operation of updating partial image data according to an embodiment of the present invention.

FIG. 21 is a sequence diagram for describing an operation of updating partial image data according to an embodiment of the present invention. This embodiment describes a case where a document is scanned again after data of a part of the initially scanned document have been modified (corrected) and the partial image data including the modified part are updated. In this embodiment, RSS data indicating that the partial image data have been updated (update RSS data) according to the partial image data including the modified part.

In the image processing apparatus 200 according to an embodiment of the present invention, when the control panel 28 receives an instruction to update partial image data, the control panel 28 sends a request for updating partial image data (update request) to the request control part 221 (Step S2101).

The control panel 28 receives the instruction to update partial image data of a document in a case where, for example, a maneuver (control) to update registration data stored in the storage part 215 is made after the document has been scanned.

When the request control part 221 receives the update request, the update control part 221 sends the update request to the searching part 222 (Step S2102). Further, the request control part 221 sends an update request report to the RSS data generating part 231 (Step S2103).

The searching part 223 searches for registration data corresponding to the update request, associates the registration data with the update partial image data, and stores the registration data in association with the updated partial image data (Step S2104).

When the RSS data generating part 231 receives the update request report from the request control part 221, the RSS data generating part 231 sends a data obtainment request corresponding to the update partial image data to the storage part 215 (Step S2105). The update request report includes update request data. The update request data include, for example, data identifying the partial image data prior to the update and data identifying the partial image data subsequent to the update.

When the storage part 215 receives the data obtainment request, the storage part 215 sends the requested partial image data to the RSS data generating part 231 (Step S2106).

Based on the partial image data received from the storage part 215 and the update request data included in the update request report, the RSS data generating part 231 updates the partial image data in accordance with the instruction for the update request and generates RSS data indicating the update (update RSS data) (Step S2107). Then, the RSS data generating part 231 registers (stores) the update RSS data in the RSS data storage part 232 (Step S2108).

Next, the following describes an exemplary operation performed by the RSS data generating part 231 in a case of updating a partial image data ID "0001" included in the metadata 92 of the document data 91 to a new partial image ID "0001NEW".

FIG. 22 is a schematic diagram illustrating update RSS data of the RSS data of FIG. 15.

When the RSS data generating part 231 receives the content of the update obtained from the control panel 28, the RSS data generating part 231 first generates RSS data regarding document data 91 which is the update target in a regular manner as described above. Then, the RSS data generating part 231 confirms the update request received from the request control part 221. The following describes a case where the update request is a request to update partial image data.

When the RSS data generating part 231 confirms the update request, the updating part 235 adds a character string "update" to a sub-element <title> of element <item> of the update RSS data of FIG. 22.

Further, the updating part 235 receives update request data indicating "change image: "/repository/0001.pdf"→"/repository/0001New.pdf" from the request control part 221 and writes the received update request data to a sub-element <comments> of element <item> of the update RSS data 161.

As described above, in this embodiment, update RSS data indicating the update content is generated when the registration data stored in the storage part 215 are updated. Further, in this embodiment, transmitting the update RSS data allows the user to recognize only the content that has been updated.

The following describes another operation where the request received by the image processing apparatus 200 is to delete document data in page units (page document data).

In a case where page document data are deleted, RSS data indicating the deletion are generated and transmitted.

Figure 23:
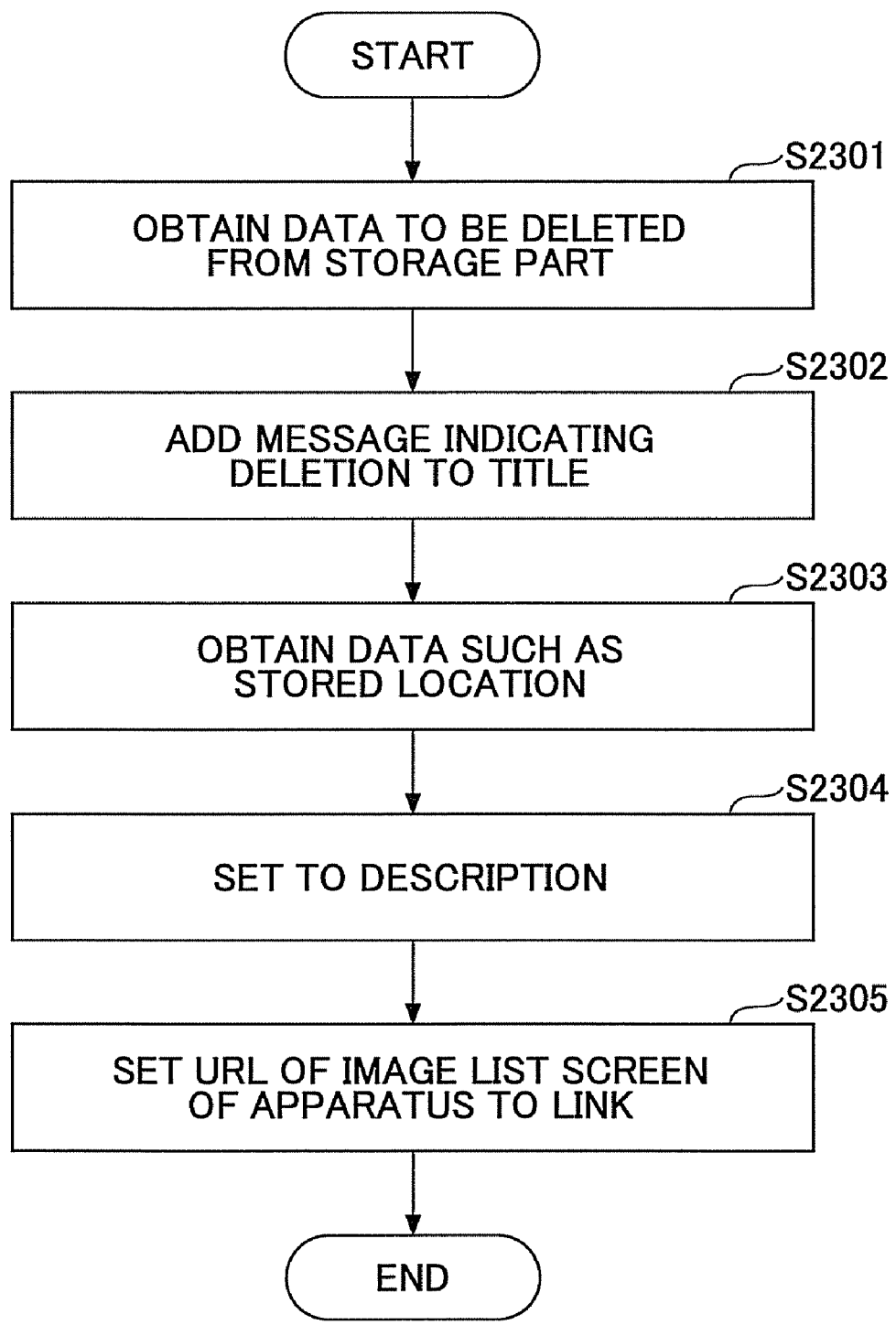
FIG. 23 is a flowchart for describing an operation of deleting document data according to an embodiment of the present invention.

Next, an exemplary operation of deleting document data is described with reference to FIG. 23. FIG. 23 is a flowchart for describing an operation of deleting document data. In this embodiment, the document data of FIG. 9 are the target to be deleted.

In the image processing apparatus 200, the request control part 221 sends a deletion request to the searching part 223 when the request control part 221 receives an instruction to delete document data. When the searching part 223 receives the deletion request, the searching part 223 obtains the metadata 92 corresponding to the document data 91 to be deleted from the storage part 215 (Step S2301).

Then, when generating RSS data with the RSS data generating part 231, the deleting part 236 adds a deletion message (message indicating that document data 91 are to be deleted) to the value of a sub-element <title> of element <item> (Step S2302). Then, the deleting part 236 obtains the data (e.g., storage location of the document data 91, and the partial image ID of partial image data included in document data 91) from the metadata (Step S2303).

Then, the deleting part 236 sets the data obtained in Step S2303 to be the value of a sub-element <description> of element <item> (Step S2304). Then, the deleting part 236 sets a URL of a screen listing the partial image included in the document data 91 (Step S2305).

FIG. 24 is a schematic diagram illustrating an example of deletion RSS data 162 that are generated by the operation of FIG. 23. In this embodiment, transmitting the deletion RSS data 162 allows the user to recognize the deleted document data.

Figure 25:
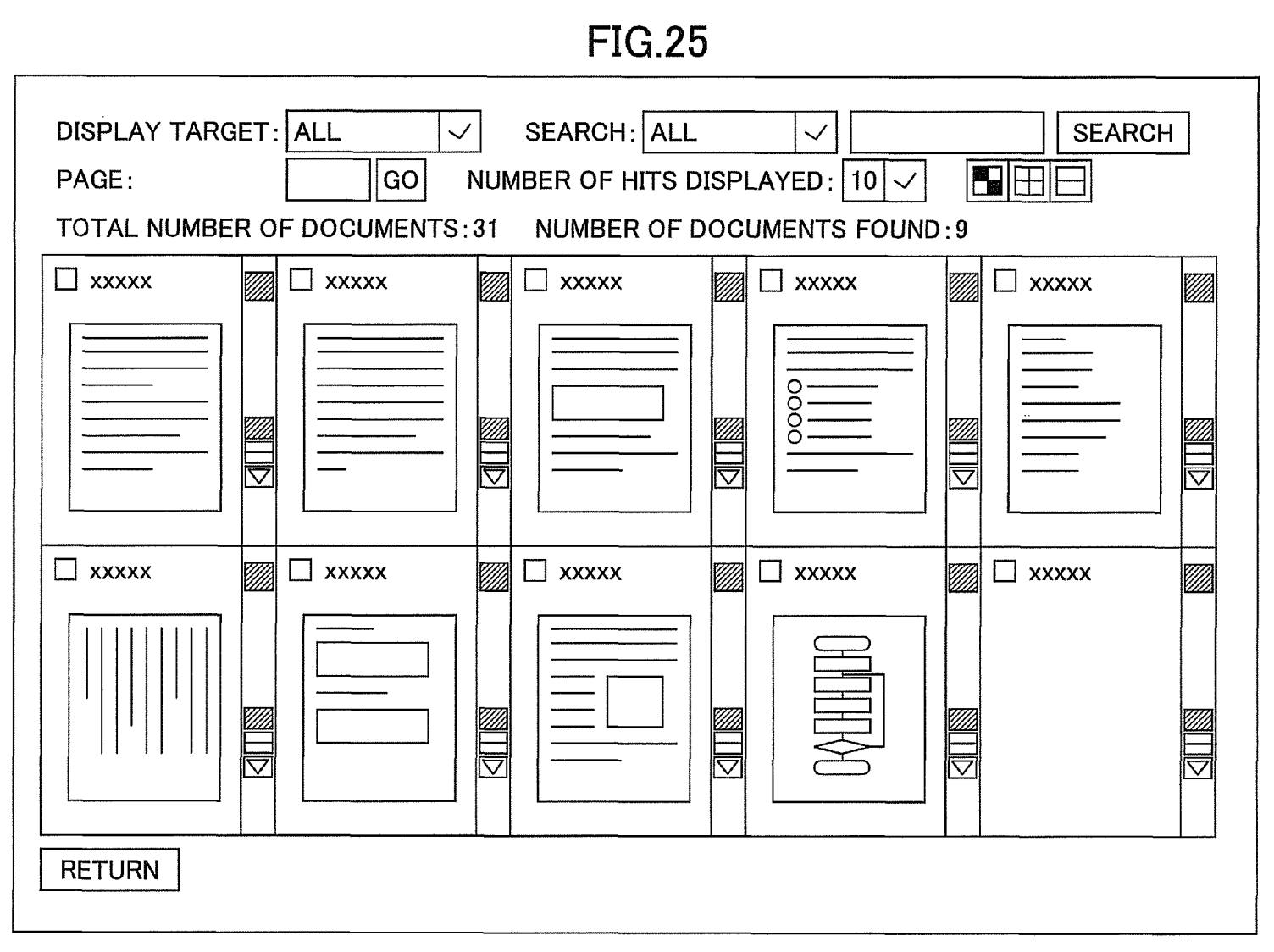

In a case where access is made to the deletion RSS data 162, an Index page (a page indicating all image data inside the image processing apparatus 200) is displayed in an output apparatus (display part) of the data processing apparatus 300. FIG. 25 is a schematic diagram illustrating an example of the Index page.

In this embodiment, the document data of a deleted page can be recovered by referring to the image data including partial image data displayed in the Index page, accessing the partial image data included in the document data of the deleted page, and combining the partial image data. For example, in a case where document data 91 are desired to be recovered, the document data 91 can be recovered by combining the partial image data 931 and 932 displayed in the Index page.

Accordingly, with this embodiment, document data (parent) can be recovered with stored partial image data (child) that constitute the document data in a case where the document data (parent) are deleted in page units.

Next, another exemplary operation of deleting document data is described. In this exemplary operation, deletion of partial image data is requested. In this case where partial image data are deleted, deletion RSS data are generated and transmitted.

Figure 26:
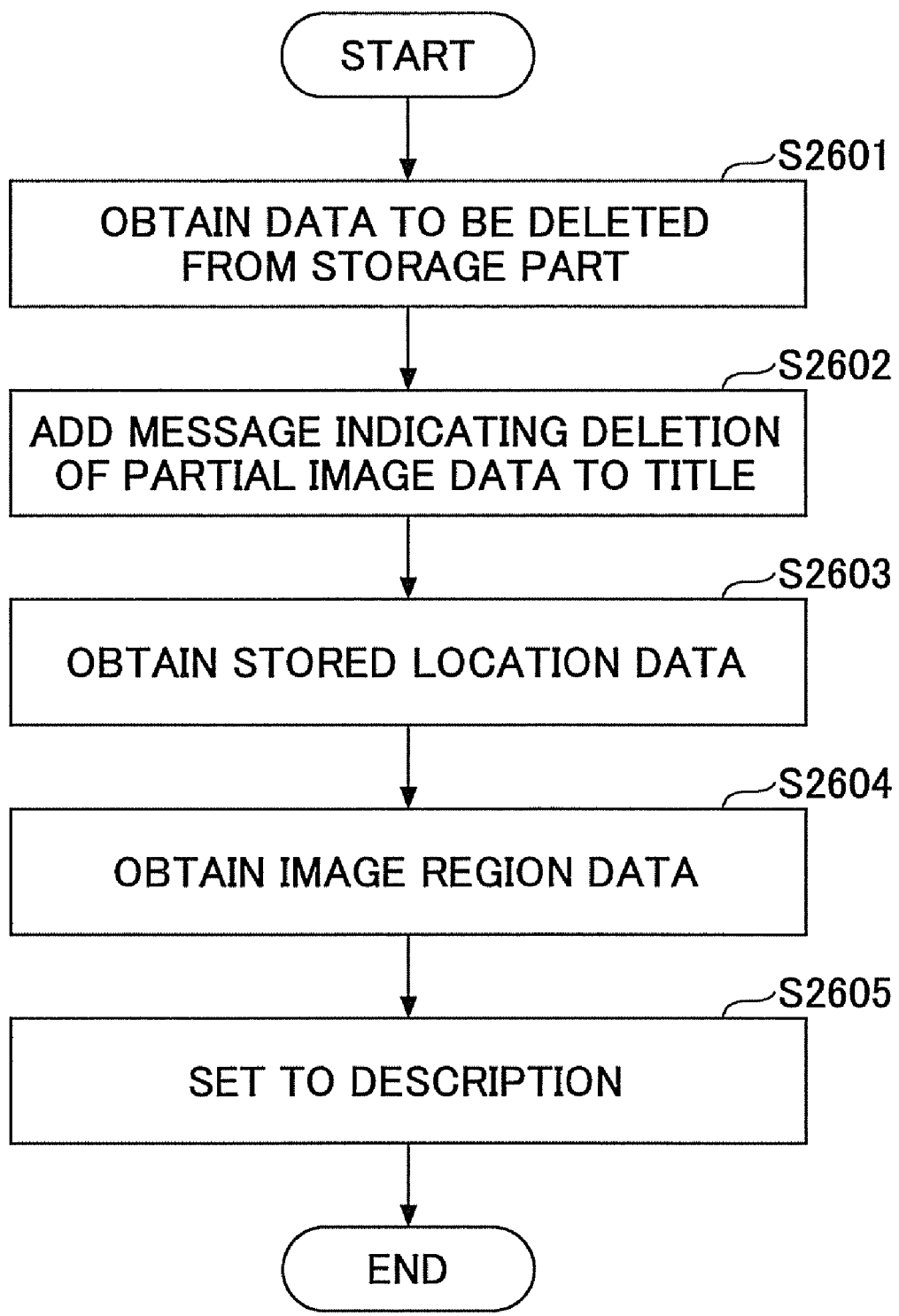
FIG. 26 is a flowchart illustrating an operation of deleting partial image data according to an embodiment of the present invention.

FIG. 26 is a flowchart illustrating an operation of deleting partial image data. In this embodiment, partial image data 931 are deleted from document data 91.

Because the process of Step S2601 is substantially the same as that of Step S2301, explanation thereof is omitted.

Then, when generating RSS data with the RSS data generating part 231, the deleting part 236 adds a deletion message (message indicating that partial image data 931 are to be deleted) to the value of a sub-element <title> of element <item> (Step S2602). Then, the deleting part 236 obtains stored location data of the partial image data from the partial image metadata 941 (Step S2603). Then, the deleting part 236 obtains coordinate data (data indicating a region of the partial image data 931) from the partial image metadata 941 (Step S2604).

Then, the deleting part 236 sets the stored location data obtained in Step S2603 and the coordinate data obtained in Step S2604 to the value of a sub-element <description> of element <item> (Step S2605).

FIG. 27 is a schematic diagram illustrating an example of deletion RSS data generated by the operation of FIG. 26. In this embodiment, transmitting the deletion RSS data of FIG. 27 allows the user to recognize the partial image data that have been deleted. In this embodiment, stored location data of the document data including the deleted partial image data are set to be a sub-element <Link> of element <item>. Therefore, the document data including the deleted partial image data can be accessed by accessing the deleted RSS data 163. Further, by accessing the coordinate data, the location of the deleted partial image data can be recognized.

In a case where restoration of the deleted partial image data is desired, the deleted partial image data can be restored by extracting the partial image data from the document data by using the coordinate data.

Accordingly, with this embodiment, in a case where partial image data (child) are deleted, the partial image data (child) can be recovered from the document data (parent) including the partial image data (child).

Next, an operation of security control performed with the image processing apparatus 200 according to an embodiment of the present invention is described.

In the image processing apparatus 200 of this embodiment, RSS data can be deleted in a case where a particular keyword is included in the text of the RSS data.

FIG. 28 is a sequence diagram illustrating a security control operation performed with the image processing apparatus 200.

In this embodiment, the RSS reader 310 of the data processing apparatus 300 transmits a request for RSS data to the Httpd part 240 of the image processing apparatus 200 (Step S2801). When the Httpd part 240 receives the request, the Httpd part 240 sends an RSS data obtainment request to the RSS data control part 233 (Step S2802). Then, the RSS data control part 233 sends an RSS data obtainment request to the RSS data storage part 232 (Step S2803).

Then, the RSS data storage part 232 sends the RSS data requested from the RSS data control part 233 to the RSS data control part 233 (Step S2804).

Then, the RSS data control part 233 sends a security keyword obtainment request (request to obtain a security keyword) to the security keyword storage part 234 (Step S2805). Then, the security keyword storage part 234 sends a security keyword list (i.e. list of security keywords) to the RSS data security part 233 (Step S2806). Then, the RSS data control part 233 performs a security control process on the requested RSS data according to the security keyword storage part 234 and sends the processed RSS data to the Httpd part 240 (Step S2807). The security control process performed on the RSS data is described in detail below. Then, the Httpd part 240 transmits the RSS data received from the RSS data control part 233 to the RSS reader 310 (Step S2808).

Figure 29:
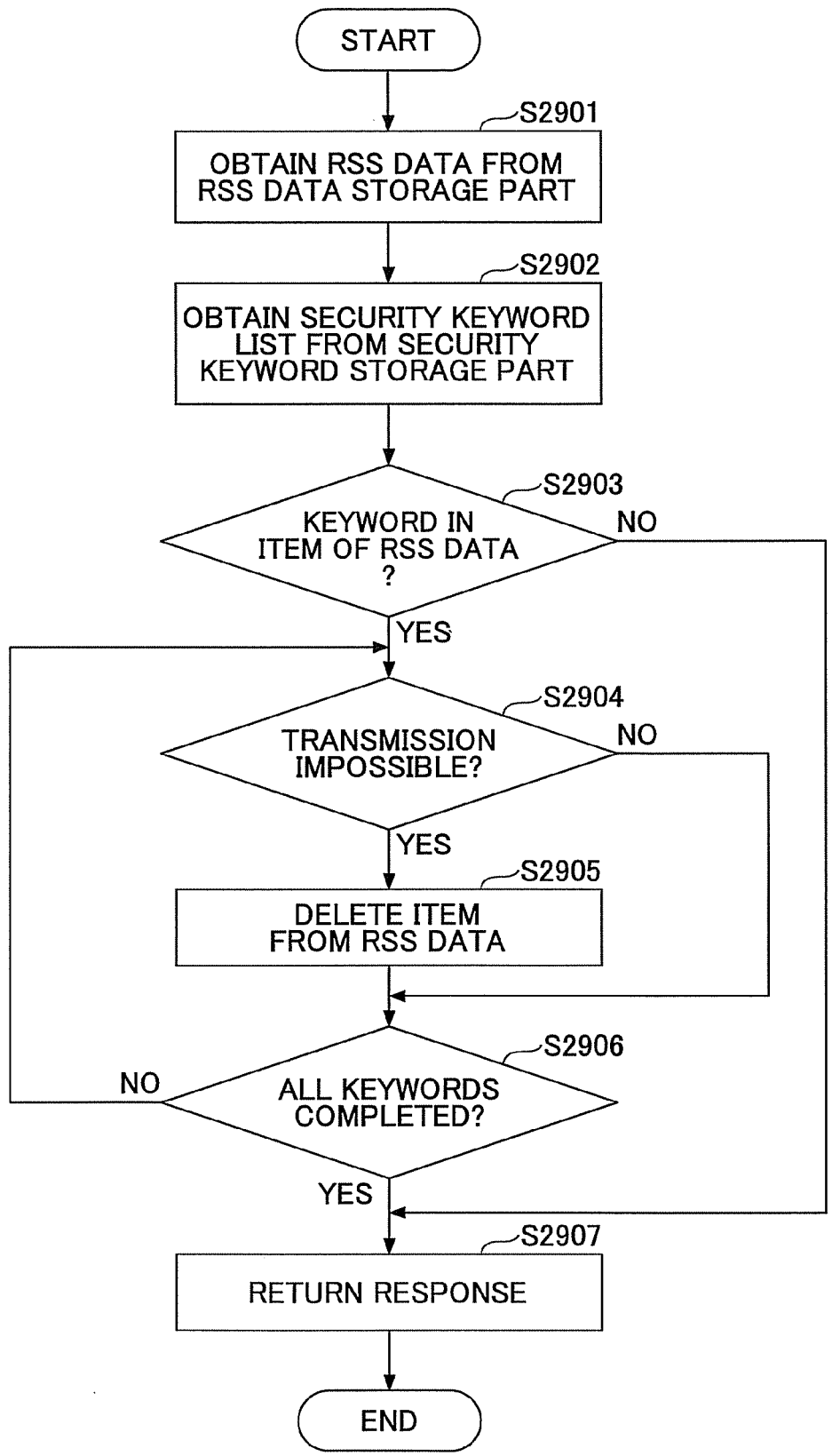
FIG. 29 is a flowchart for describing a security control process performed on RSS data by an RSS data control part according to an embodiment of the present invention.

FIG. 29 is a flowchart for describing a security control process performed on RSS data by the RSS data control part 233 according to an embodiment of the present invention.

The RSS data control part 233 obtains RSS data from the RSS data storage part 232 (Step S2901). Then, the RSS data control part 233 obtains a security keyword list from the security keyword storage part 234 (Step S290). In this embodiment, the security keyword list is stored in the security keyword storage part 234 beforehand.

Then, the RSS data control part 233 checks (determines) whether the text data in the element <item> of the RSS data obtained in Step S2901 includes a keyword listed in the security keyword list (Step S2903). In a case where a keyword is included in the text data (Yes in Step S2903), the RSS data control part 233 determines whether RSS data including the keyword can be transmitted (Step S2904).

In a case where the keyword cannot be transmitted in the RSS data (Yes in Step S2904), the RSS data control part 233 deletes the corresponding element <item> from the RSS data (Step S2905). In a case where the keyword can be transmitted in the RSS data (No in Step S2904), the RSS data control part 233 proceeds to Step S2906.

Then, the RSS data control part 233 determines whether all keywords in the security keyword list have been checked (Step S2906). In a case where not all of the keywords have been checked (No in Step S2906), the RSS data control part 233 returns to Step S2903. In a case where all of the keywords have been checked (Yes in Step S2906), the RSS data control part 233 transmits a response including the RSS data to the RSS reader 310 via the Httpd part 240 (Step S2907).

With the above-described embodiment, the RSS data control part 233 checks the security of RSS data in a case of receiving a request for RSS data.

Next, the RSS data on which a security control process is performed by the operation of FIG. 29 are described with reference to FIGS. 30 and 31.

FIG. 30 is a schematic diagram illustrating an example of an item of RSS data deleted by the RSS data control part 233 by the operation of FIG. 29. FIG. 31 is a schematic diagram illustrating an example RSS data generated based on the operation of FIG. 29. In the examples of FIGS. 30 and 31, the security keyword that cannot be transmitted in the RSS data is "security hole".

With reference to FIG. 30, the RSS data control part 233 determines that the text data in element <item> of RSS data of FIG. 30 include a keyword matching the keyword "security hole". After determining that "security hole" cannot be transmitted in the RSS data, the RSS data control part 233 deletes all of the data in the element <item> of the RSS data of FIG. 30.

FIG. 31 shows RSS data 165 in a state where the element <item> of FIG. 30 is deleted therefrom. Based on the determination of the RSS data control part 233, a part of the data of the element <item> (indicated by a frame 166 of FIG. 31) is deleted.

With the above-described embodiment, transmission of RSS data can be performed after extracting text data from image data read by the scanning part 21 and comparing the text data with security keywords. Accordingly, in a case where the image processing apparatus 200 stores data containing contents prohibited from being output to the outside for security purposes, transmission of such data can be prevented.

Next, the settings for transmitting RSS data with the image processing apparatus 200 according to an embodiment of the present invention are described. In this embodiment, a terminal (not illustrate) can access the image processing apparatus 200 by using a web browser and perform various settings for RSS data transmission on the image processing apparatus 200. When the image processing apparatus 200 receives setting conditions for RSS transmission from the web browser of the terminal (not illustrated), the RSS data control part 233 sets the setting condition for performing RSS transmission between the image processing apparatus 200 and the RSS reader 310.

Figure 32:
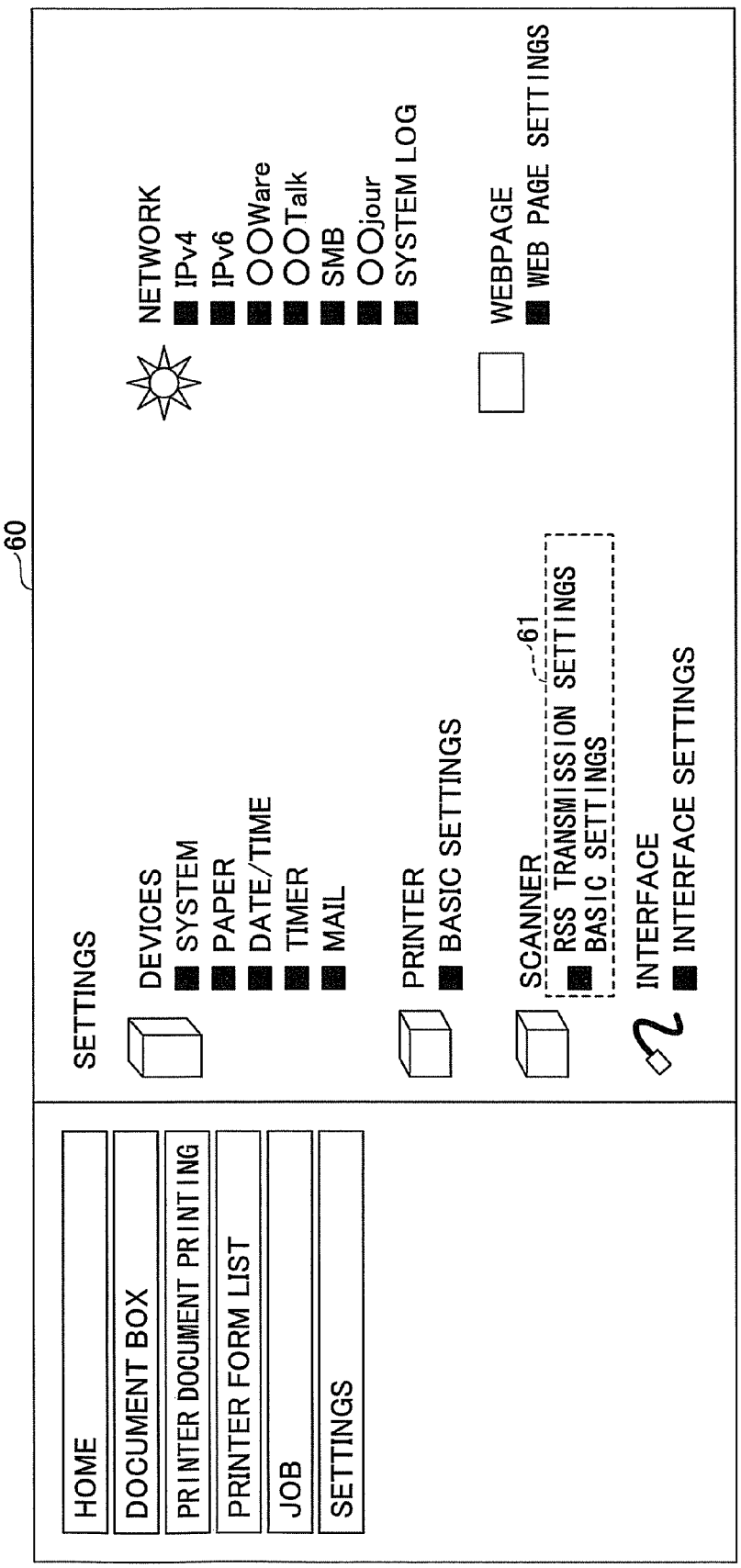
FIG. 32 is a schematic diagram illustrating an example of a setting screen displayed on a web browser according to an embodiment of the present invention.

Next, settings of the image processing apparatus 200 according to an embodiment of the present invention are described with reference to FIGS. 32 and 33. FIG. 32 is a schematic diagram illustrating an example of a setting screen 60 displayed on a web browser. FIG. 33 is a schematic diagram illustrating another example of a setting screen 62 displayed on a web browser.

In the setting screen 60 of FIG. 32, a link button 61, which is linked to a screen 62 for performing basic settings of RSS transmission (RSS transmission setting screen), is displayed on the setting screen 60. When the link button 61 is pressed, the web browser displays the RSS transmission setting screen 62 as illustrated in FIG. 33.

In the setting screen 62 of FIG. 33, a channel for transmitting RSS data can be set. In this embodiment, in a case where a check box 63 of original data of <document transmission settings>-<automatic division transmission> is checked, the RSS data control part 233 sets a channel for performing RSS data transmission in document data units between the image processing apparatus 200 and the RSS reader 310.

In a case where a check box 64 of partial image data of <document transmission settings>-<automatic division transmission> is checked, the RSS data control part 233 sets a channel for performing RSS data transmission in partial image data units between the image processing apparatus 200 and the RSS reader 310.

With this embodiment, transmission of RSS data in units of document data, units of pages of document data, or units of partial image data can be performed. Therefore, in a case where partial image data and document data including the partial image data both exist, the user can have only desired data transmitted by setting transmission conditions (e.g., unit of data to be transmitted) beforehand.

Typically, in a case where the same data are transmitted plural times, it is difficult for the user to access desired data. However, with this embodiment, the user can easily access desired data because transmission is performed in units based on predetermined channels.

Further, with this embodiment, channels corresponding to the checked check boxes 63, 64 of <document transmission settings> and channels corresponding to the checked check boxes of <metadata transmission settings> may also be added as channels for performing RSS data transmission with the <RSS setting basic settings> of FIG. 61.

Figure 34:
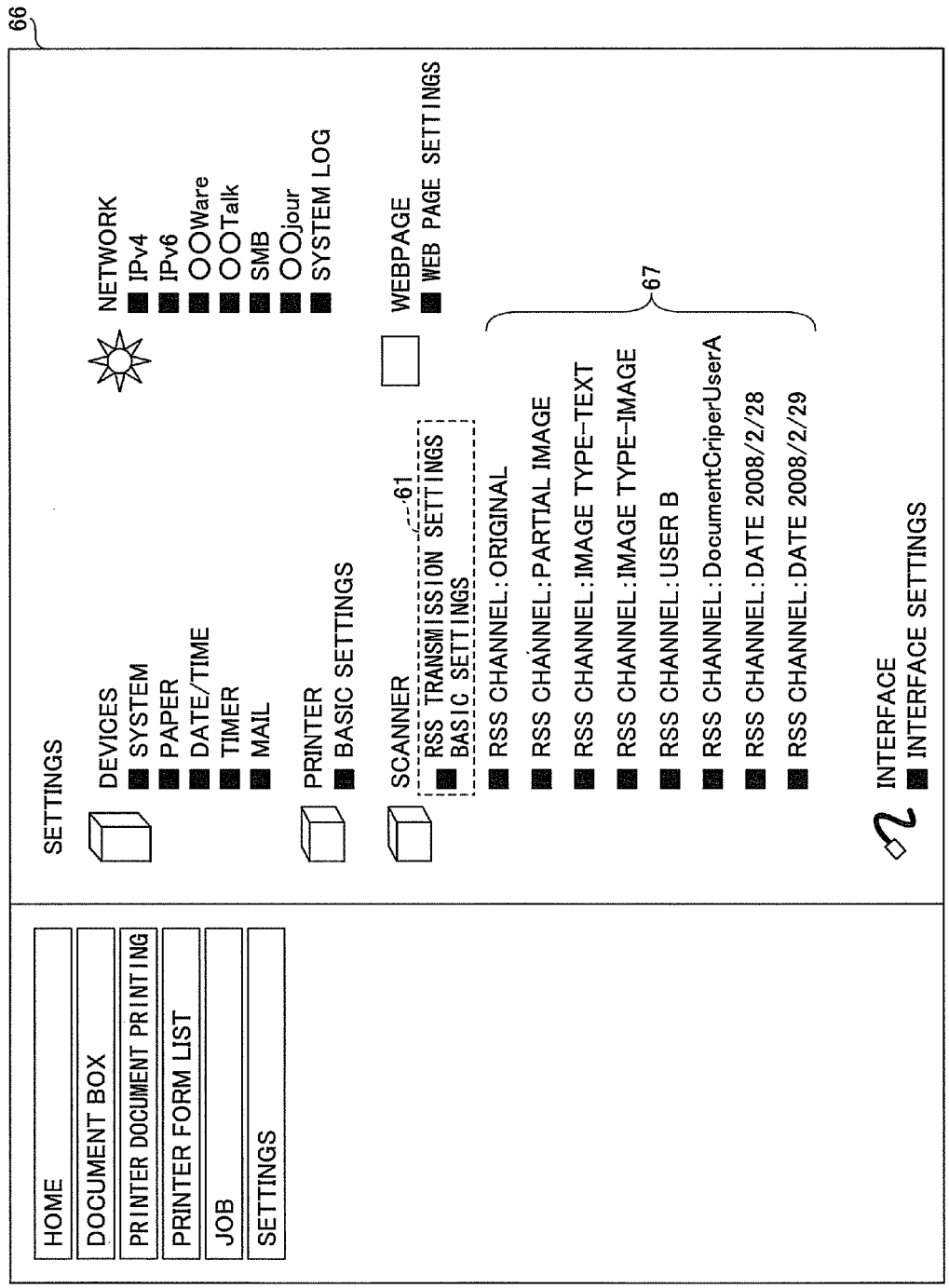
FIG. 34 illustrates an example of a setting screen after channels for RSS transmission have been added according to an embodiment of the present invention.

FIG. 34 illustrates an example of a setting screen after channels for RSS transmission have been added. For example, after the check boxes 63, 64, 65 of the setting screen 62 are checked, the setting screen 60 of FIG. 32 becomes a setting screen 66 of FIG. 34.

In the setting screen 66 of FIG. 34, link buttons 67 corresponding to channels (including newly added channels) are displayed. When one of the link buttons 67 in the setting screen 66 is pressed, the web browser displays a setting page of each channel of a corresponding link destination.

FIG. 35 illustrates an example of a setting screen for <RSS channel original>. For example, in a case where the link button 67 of <RSS channel original> is pressed, the setting screen 68 of FIG. 35 is displayed.

Figure 36:
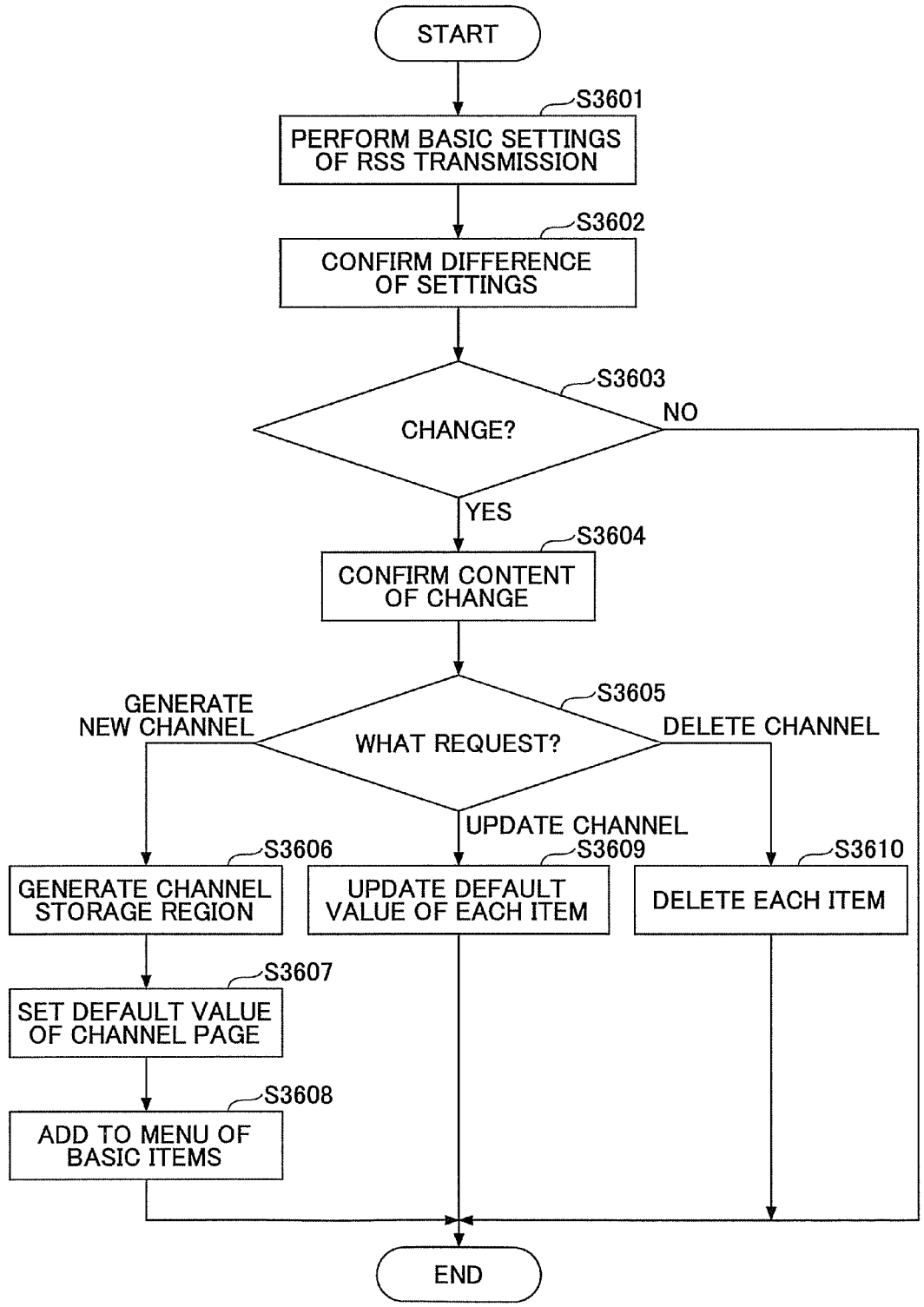
FIG. 36 is a flowchart for describing an operation of adding a channel for RSS data transmission to <RSS transmission setting basic settings> according to an embodiment of the present invention.

Next, an operation of adding a channel for RSS data transmission to <RSS transmission setting basic settings> is described with reference to FIG. 36. FIG. 36 is a flowchart for describing an operation of adding a channel for RSS data transmission to <RSS transmission setting basic settings>.

When performing of basic settings of RSS data transmission is selected (Step S3601) in the setting screen 60 displayed by a web browser, the RSS data control part 233 confirms a channel(s) added to the basic settings of the setting screen 62 (setting difference) (Step S3602). Based on the confirmation of the setting difference, the RSS data control part 233 determines whether there is a change in the channels in the basic settings (Step S3603).

In a case where the RSS data control part 233 determines that the channel has been changed, the RSS data control part 233 confirms the content of the change (Step S3604). In a case where the RSS data control part 233 determines that the channel has not been changed, the RSS data control part 233 terminates the operation.

Based on the confirmation of the content of the change, the RSS data control part 233 determines whether the content of the change is a request for generation of a new channel, update (change) of a channel, or deletion of a channel (Step S3605). In a case where the content of the change is a request for generation of a new channel, the RSS data control part 233 generates a channel storage region (Step S3606). Then, the RSS data control part 233 sets a default value for the channel storage region (Step S3607). Then, the RSS data control part 233 adds the newly added channel to the basic settings of the setting screen 60 (Step S3608). The channel storage region may be provided, for example, in the storage part 215 of the image processing apparatus 200 or in a storage part of an outside terminal.

In a case where the content of the change is determined as a request for updating a default value of an existing channel in Step S3605, the RSS data control part 233 updates the default value (Step S3609). In a case where the content of the change is determined as a request for deleting a channel in Step S3605, the RSS data control part 233 deletes the corresponding channel (Step S3610).

In this embodiment, a channel may also be added to metadata in item units in the same manner described in the operation of FIG. 36. For example, <RSS Channel: User B> or <RSS Channel: Date> included in the link buttons 67 of FIG. 34 may be added as channels to metadata in item units. The <RSS Channel: Date> may include a channel transmitting metadata having a date of Feb. 28, 2008.

For example, in a case where various data items (e.g., image, text, table) are included in document data, a large amount of time may be required for the user to access desired data if all of the various data items are to be transmitted. Therefore, in this embodiment, the user can set only data desired because a channel(s) for RSS data transmission can be added in metadata units. For example, with this embodiment, only text data can be transmitted. Further, with this embodiment, only the data indicating the date on which document data has been input can be transmitted.

Second Embodiment

Next, a second embodiment of the present invention is described. This embodiment describes a case where document data do not have partial image data whose image type is "text". In this embodiment, like components are denoted by like reference numerals as of the first embodiment and are not further described.

Figure 37:
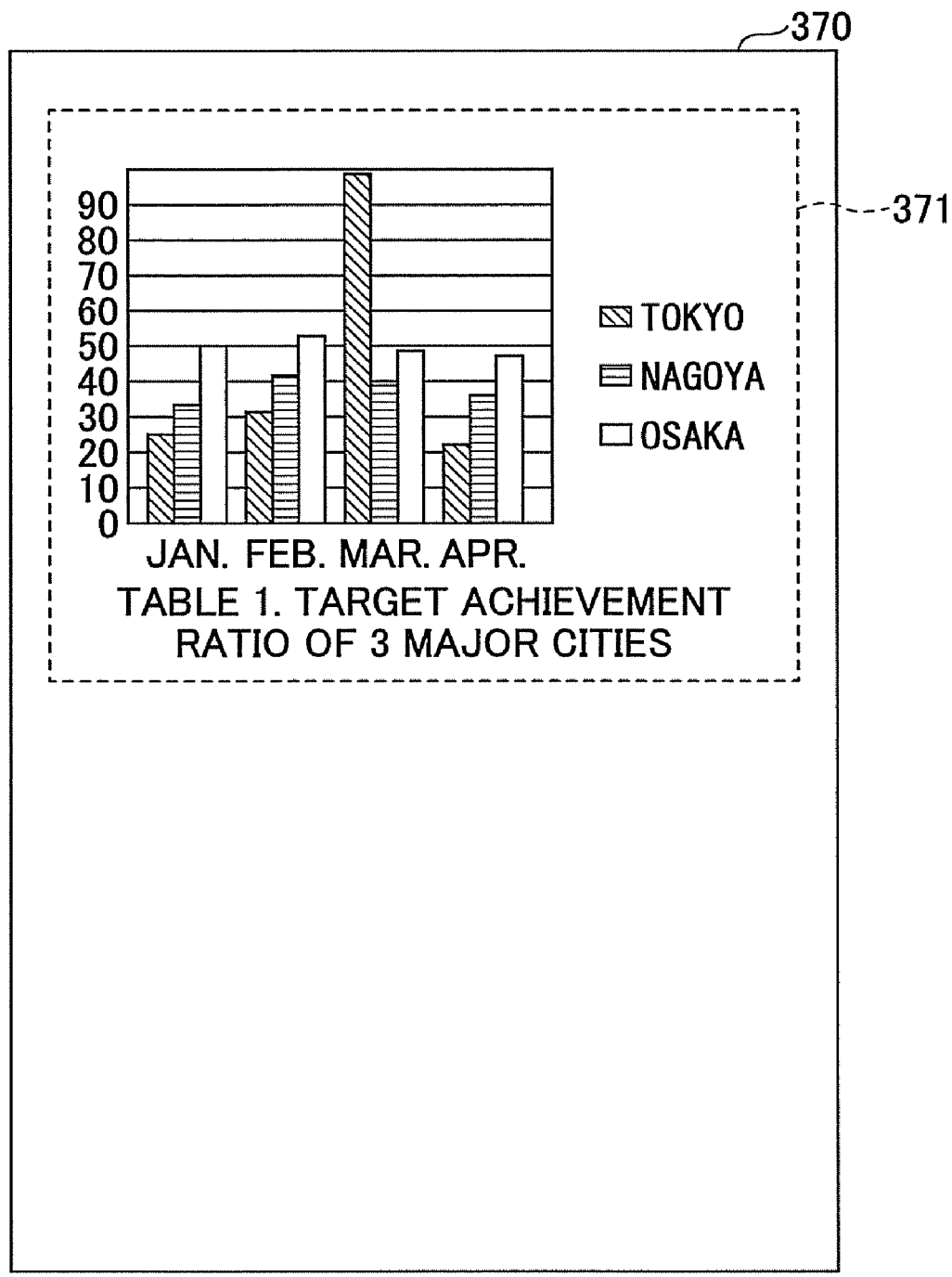
FIG. 37 is a schematic diagram illustrating an example of document data input by the document input part according to an embodiment of the present invention.

FIG. 37 is a schematic diagram illustrating an example of document data 370 input by the document input part 211 according to the second embodiment of the present invention. As illustrated in FIG. 37, the document data 370 include partial image data 371. FIG. 38 is a schematic diagram illustrating an example of partial image metadata 381 corresponding to the partial image data 371.

The image type of the partial image data 371 is identified as "table". Although FIG. 37 illustrates text data included in the partial data 371 of the document data 370, no partial image data included in the document data 370 are identified as the image type "text".

Next, an exemplary operation of generating RSS data of the document data 370 having no partial image data identified as "text" is described.

For example, the RSS data generating part 231 generates RSS data using the text located in the vicinity of the partial image data 371.

Because the partial image data 371 contains text which can be used as the title of the table, text data (e.g., "Table 1") are extracted from the partial image data 371 and included in the partial image metadata 381.

In this embodiment, the RSS data generating part 231 refers to the partial image metadata 381, extracts the text metadata corresponding to the text data in the partial image data 371, and sets the extracted text metadata to the values of sub-elements <title> and <description> of element <item> of the RSS data.

For example, the RSS data generating part 231 sets the title of the table "Table 1" to the value of sub-element <title> based on the text metadata 381. Further, the RSS data generating part 231 sets all of the text metadata of the partial image metal data 381 to the value of the sub-element <description>.

FIG. 39 is a schematic diagram illustrating an exemplary configuration of element <item> of RSS data that is generated based on the document data 370.

In FIG. 39, text "Table 1" is set to the value of sub-element <title> in line 391, and text "Table 1. Target Achievement Ratio of 3 Major Cities" is set to the value of sub-element <description> in line 392.

With the above-described embodiment, even in a case where the image type of the partial image data included in document data is not "text", RSS data can be generated to allow the user to recognize the content of the document data.

Third Embodiment

Next, a third embodiment of the present invention is described. This embodiment describes another case where document data do not have partial image data whose image type is "text". In this embodiment, like components are denoted by like reference numerals as used for the first embodiment and are not further described.

This embodiment is different from the second embodiment in that the partial image data include no text.

Figure 40:
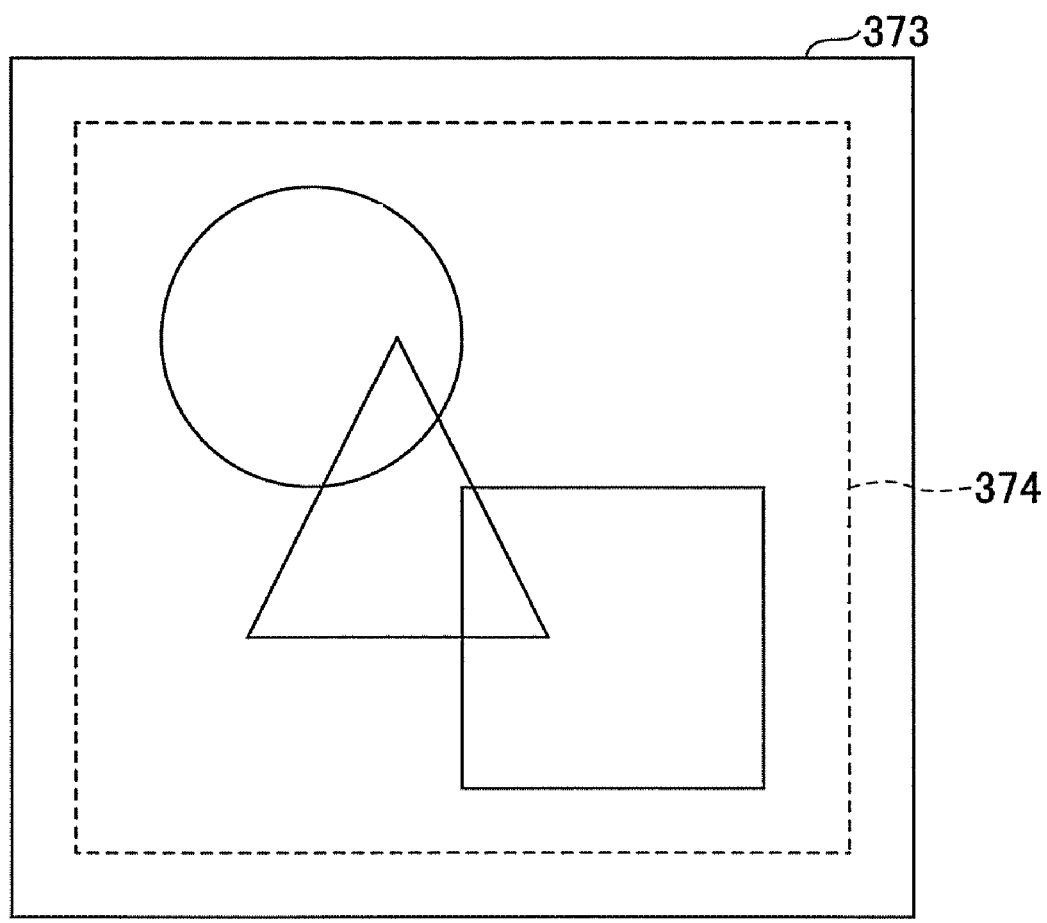
FIG. 40 is a schematic diagram illustrating an example of document data input by the document input part according to an embodiment of the present invention.

FIG. 40 is a schematic diagram illustrating an example of document data 373 input by the document input part 211 according to the third embodiment of the present invention. As illustrated in FIG. 40, the document data 373 includes partial image data 374. FIG. 41 is a schematic diagram illustrating an example of partial image metadata 382 corresponding to the partial image data 374.

As illustrated in FIG. 40, the partial image data 374 include no text. Therefore, the corresponding partial image metadata 382 also include no text.

Accordingly, in this embodiment, the RSS data generating part 231 refers to the partial image metadata 382, extracts specific metadata (e.g., metadata indicating the time of scanning a document, metadata indicating the name of the user who sent the instruction to obtain document data 373 by scanning of a document), and sets the extracted metadata to the values of sub-elements <title> and <description> of element <item> of the RSS data.

For example, the RSS data generating part 231 sets the scanned time of the partial image metadata 382 to the value of sub-element <title>. Further, the RSS data generating part 231 sets the user name of the partial image metadata 382 to the value of the sub-element <description>.

FIG. 42 is a schematic diagram illustrating an exemplary configuration of element <item> of RSS data that is generated based on the document data 373.

In FIG. 42, scanning time "Sun, 19, May 2008 15:21:36 GM" included in the partial image metadata 382 is set to the value of sub-element <title> in line 383, and user data item "DocumentCriperUserA" included in the partial image metadata 382 is set to the value of sub-element <description> in line 384.

With the above-described embodiment, even in a case where the image type of the partial image data included in document data is not "text" and no text is included in the partial image data, RSS data can be generated to allow the user to identify the document data.

Fourth Embodiment

Next, a fourth embodiment of the present invention is described. This embodiment describes a case where document data have plural partial image data items whose image type is "text". In this embodiment, like components are denoted by like reference numerals as used for the first embodiment and are not further described.

Figure 43:
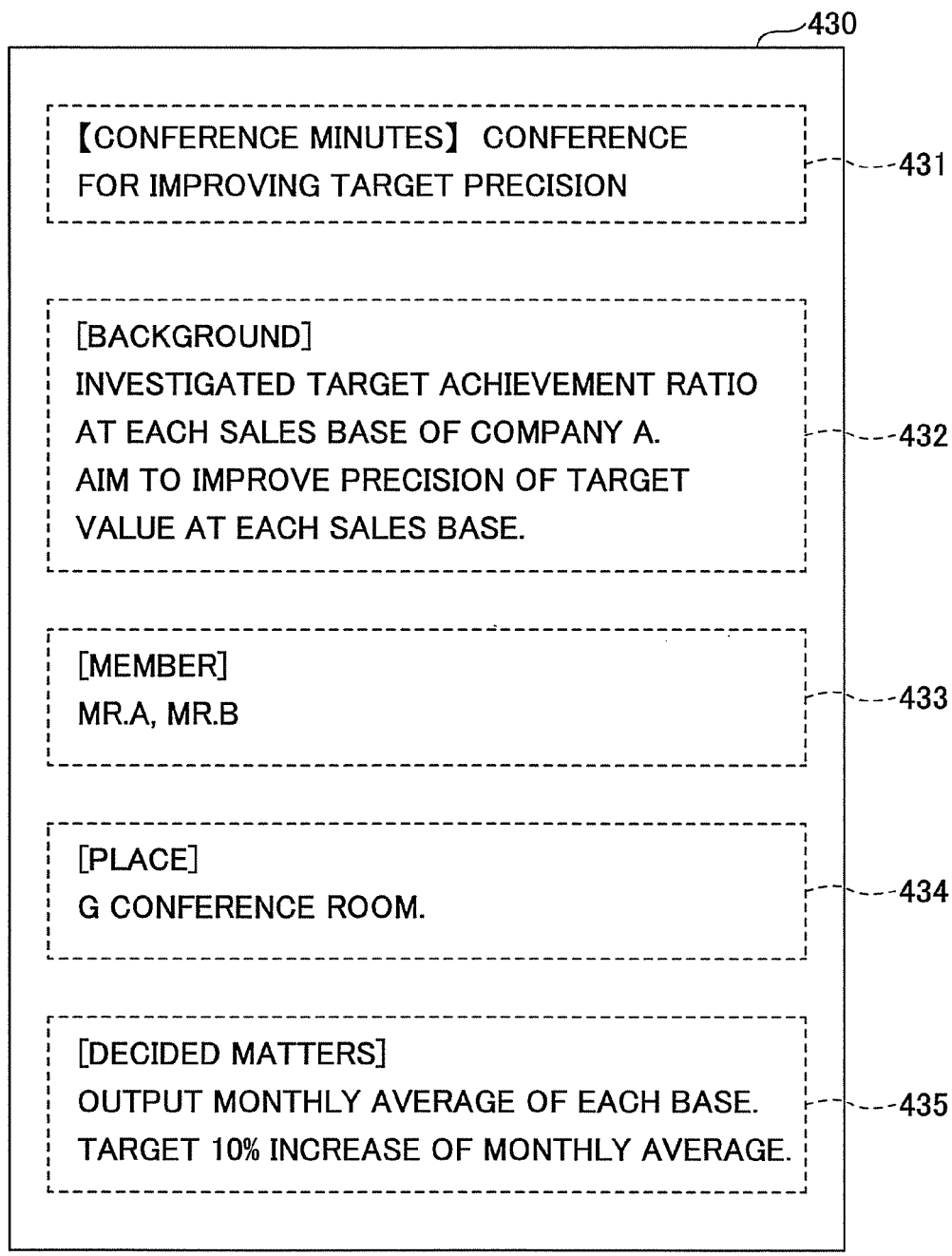
FIG. 43 is a schematic diagram illustrating an example of document data input by a document input part according to an embodiment of the present invention.

FIG. 43 is a schematic diagram illustrating an example of document data 430 input by the document input part 211 according to the fourth embodiment of the present invention. As illustrated in FIG. 43, the document data 430 include partial image data 431, 432, 433, 434, and 435. Each of the plural partial image data 431, 432, 433, 434, 435 is identified as image type "text".

In this embodiment, the RSS data generating part 231 sets the most frequently used keyword among the text in the partial image data 431-435 of the document data 430 to the value of the sub-element <title> of element <item>.

In the document data 430, a keyword "target" is used for a total of 4 times among the partial image data 431-435 (i.e. once in the partial image data 431, twice in the partial image data 432, and once in the partial image data 435). Therefore, the most frequently used keyword in the document data 430 is "target".

Accordingly, in this embodiment, the RSS data generating part 231 sets the keyword "target" to the value of the sub-element <title>.

With the above-described embodiment, even in a case where document data include plural partial image data identified as "text", an appropriate title matching the content of the document data can be applied when generating RSS data.

In this embodiment, the RSS data generating part 231 may include a table including a specific keyword, a value of <title>, and a value of <description> associated with each other. Thereby, the RSS data generating part 231 may generate RSS data by referring to the table 440.

FIG. 44 is a schematic diagram illustrating a table 440 included in the RSS data generating part 231. In the table 440, a keyword, the value of <title>, and the value of <description> are associated with each other. For example, in the table 440 illustrated in FIG. 44, a value of sub-element <title> "conference A" and a value of sub-element <description> "every Friday 5 PM—regular" are associated with the keyword "target".

In this embodiment, the RSS data generating part 231 refers to the table 440 after determining the most frequently used keyword in the document data 430. Because the most frequently used keyword is "target", the RSS data generating part 231 sets "conference A" to the value of sub-element <title>, sets "every Friday 5 PM—regular", and associates the set values with the keyword "target".

Although this embodiment describes generating RSS data by using the most frequently used keyword, RSS data may be generated by using other keywords. For example, the significance of keywords can be set with respect to each keyword. Thereby, the RSS data generating part 231 can refer to the table 440 using the keyword having the highest significance.

With the above-described embodiment, RSS data can be generated based on content set beforehand according to the keyword included in document data. This allows the user to easily recognize the content of the document data.

Fifth Embodiment

Next, a fifth embodiment of the present invention is described. This embodiment describes a case of combining plural partial image data included in document data and setting the conditions for transmitting RSS data including the combined plural partial image data.

FIG. 45 is a schematic diagram illustrating an example of a setting screen 68A used for setting the conditions for transmitting a combination of partial image data. The setting screen 68A of FIG. 45 is a setting screen that is displayed when a link button 67 <RSS channel: original> in the setting screen 60 of FIG. 34 is pressed.

The setting screen 68A displays a combination setting part 68B used for setting the combination of partial image data. For example, in a case where "combined transmission settings" is set as "Yes" in the combination setting part 68B, RSS data including a combination of partial image data are transmitted. In this embodiment, the number of partial image data items to be combined can be set by using the combination setting part 68B. Further, the limit of the number of partial image data items to be combined may be determined beforehand based on, for example, the size of the combined partial image data.

The following describes an exemplary case where two partial image data items included in the document data 40 of FIG. 7 are set to be combined. The document data 40 include partial image data S1, S2, and S3. The RSS control part 233 combines partial image data whose image type is not "text" (in this case, partial image data S2 and S3) and transmits RSS data including the combined partial image data.

Although partial image data items whose image type is not "text" are combined in the above-described embodiment, partial image data whose image type is "text" may be combined with other partial image data.

With the above-described embodiment of the present invention, partial image data items, which are recognized as separate regions by the region extracting part 212 of the image processing apparatus 200, can be combined into a single partial image data item and transmitted as a combination.

Sixth Embodiment

Next, a sixth embodiment of the present invention is described. This embodiment describes a case of transmitting RSS data based on the confidentiality of the partial image data.

The first embodiment describes a case where transmission of RSS data is determined depending on whether there is a keyword included in partial image data that matches a security keyword. In this embodiment, transmission of RSS data is determined based on confidentiality of partial image data.

For example, transmission of RSS data can be cancelled in a case where tint block data are included in partial image data or a case where partial image data include specific image data having high confidentiality.

This embodiment is described using the document data 40 of FIG. 6 where the partial image data S1 of document data 40 include tint block data and the partial image data S2 of the document data 40 include an image having high confidentiality.

Figure 46:
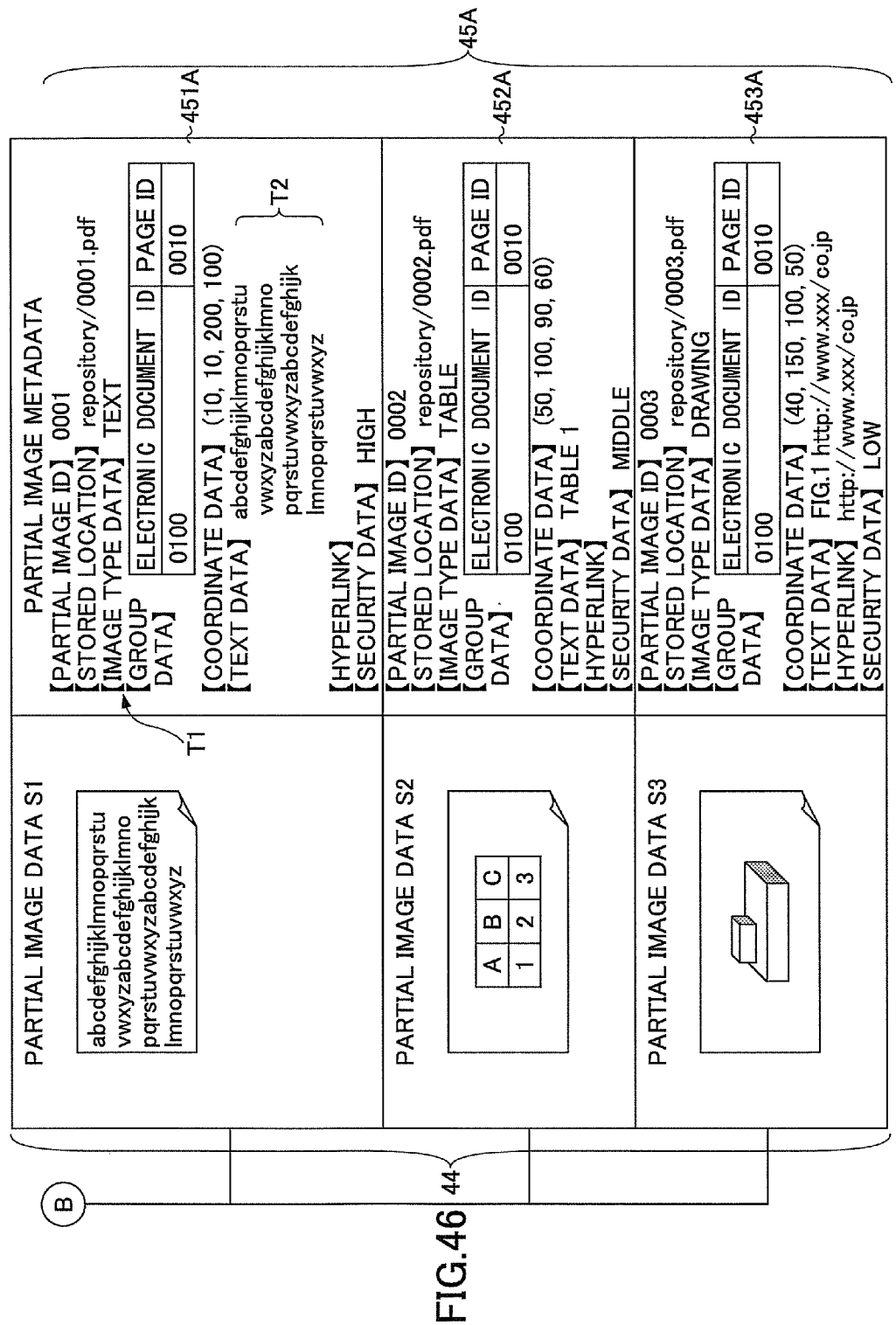
FIG. 46 is a schematic diagram for describing the level of confidentiality of partial image data according to an embodiment of the present invention.

FIG. 46 is a schematic diagram for describing the level of confidentiality of partial image data according to an embodiment of the present invention.

When setting partial image metadata for each corresponding partial image data item included in the document data, the metadata setting part 216 of the image processing apparatus 200 inserts security data (data indicating the level of confidentiality of the partial image data) in the partial image metadata.

FIG. 46 is a schematic diagram illustrating an example of partial image metadata including security data. The partial image metadata 451A are metadata of the partial image data S1. The partial image metadata 452A are metadata of partial image data S2. The partial image metadata 453A are metadata of partial image data S3. Security data of the partial image data S1, S2, and S3 are included in corresponding partial image metadata 451A, 452A, and 453A.

For example, the partial image metadata 451A include "security data HIGH" indicating that the level of confidentiality of the partial image data S1 is high. The partial image metadata 452A include "security data MIDDLE" indicating that the level of confidentiality of the partial image data S2 is middle. The partial image metadata 453A include "security data LOW" indicating that the level of confidentiality of the partial image data S3 is low.

The security data may be obtained from each partial image data item when partial image data are extracted from document data by the region extracting part 212.

In one exemplary case, the registration process part 210 may have a security table (not illustrated) that includes image data associated with security data. In this case, the region extracting part 212 refers to the security table when extracting partial image data from document data and determines whether there are partial image data matching the image data in the security table. In a case where image data corresponding to the partial image data are included in the security table, the region extracting part 212 may obtain the security data corresponding to the extracted partial image data. Then, the metadata setting part 216 may register the obtained security data in the storage part 215.

For example, when the partial image data S1 are extracted by the region extracting part 212 where the partial image data S1 include tint block data and the tint block data are associated with "security data HIGH", the region extracting part 212 obtains "security data HIGH". The partial image metadata 451A are set to include the obtained security data as illustrated in FIG. 46.

The same applies to the partial image data S2 corresponding to the partial image metadata 452A and the partial image data S3 corresponding to the partial image metadata 453A.

The RSS data control part 233 of this embodiment can control transmission of RSS data (e.g., preventing transmission of RSS data including partial image data indicated as "security data HIGH").

In this embodiment, a channel for transmitting RSS data having "security data HIGH" may be set.

Figure 47:
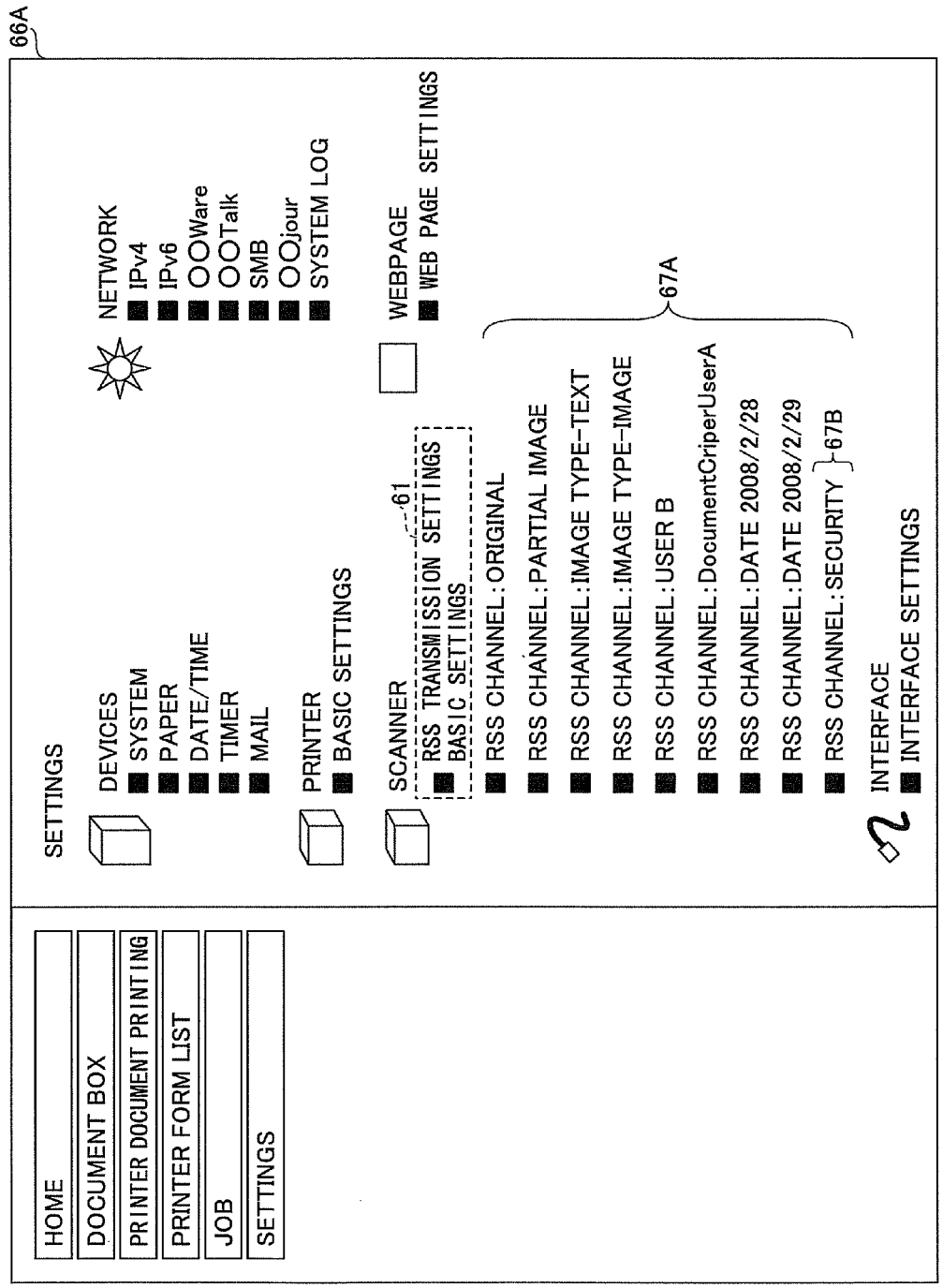
FIG. 47 is a schematic diagram illustrating an example of a setting screen having a security channel set when setting conditions of RSS data transmission according to an embodiment of the present invention.

FIG. 47 is a schematic diagram illustrating an example of a setting screen having a security channel set when setting conditions of RSS data transmission.

In the setting screen 66A of FIG. 47, the link button 67A corresponding to the channels in "RSS transmission settings basic settings" includes a link button 67B used for setting a channel for security.

When the link button 67B of the setting screen 66A is pressed, a security setting screen (not illustrated) for transmitting RSS data based on security data is displayed. For example, the security setting screen may be used to set the destination to which RSS data including "security data HIGH" are transmitted or set cancellation of transmission of RSS data including "security data HIGH".

For example, the link button 67B may only be displayed in a case where a user having access to high confidentiality data logs in by using a terminal for setting the image processing apparatus 200.

With the above-described embodiment, setting of RSS data transmission can be performed based on security data indicating the level of confidentiality of data.

The present invention is not limited to the specifically disclosed embodiments, and variations and modifications may be made without departing from the scope of the present invention.

The present application is based on Japanese Priority Application Nos. 2008-269922 and 2009-202924 filed on Oct. 20, 2008 and Sep. 2, 2009, respectively, the entire contents of which are hereby incorporated herein by reference.

What is claimed is:

1. An image processing apparatus comprising:
an input part configured to input document data of a document;
an extracting part configured to automatically extract partial image data from the document data;
a storage part configured to store the document data and configuration data of the document data;
a registering part configured to associate the document data with the partial image data and register the document data and the associated partial image data in the storage part;
a generating part configured to generate push-type data based on the configuration data; and
a transmitting part configured to transmit the push-type data;
wherein the transmission of the push-type data is automatically initiated without any request to the image processing apparatus.

2. The image processing apparatus as claimed in claim 1, wherein the document data include page document data formed by dividing the document data into separate pages,
wherein the generating part includes an updating part configured to update at least one of the partial image data and the page document data,
wherein in a case where the updating part updates at least one of the partial image data and the page document data, the generating part is configured to generate update data indicating the update and attach the generated update data to the push-type data.

3. The image processing apparatus as claimed in claim 2, wherein in the case where the updating part updates at least one of the partial image data and the page document data, the generating part is configured to generate update title data and update content data, wherein the update title data are to be attached to a title of the push-type data, wherein the update content data indicate the content of the update.

4. The image processing apparatus as claimed in claim 2, wherein the generating part further includes a deleting part configured to delete the page document data,
wherein in a case where the deleting part deletes the page document data, the generating part is configured to generate deletion data indicating the deletion and attach the generated deletion data to the push-type data.

5. The image processing apparatus as claimed in claim 4, wherein in the case where the deleting part deletes the page document data, the generating part is configured to generate page deletion title data and page deletion content data, wherein the page deletion title data are to be attached to a title of the push-type data, wherein the deletion content data indicate the content of the deletion.

6. The image processing apparatus as claimed in claim 2, wherein the generating part further includes a deleting part configured to delete the partial image data,
wherein in a case where the deleting part deletes the partial image data, the generating part is configured to generate deletion data indicating the deletion and attach the generated deletion data to the push-type data.

7. The image processing apparatus as claimed in claim 6, wherein in the case where the deleting part deletes the partial image data, the generating part is configured to generate partial image deletion title data and partial image coordinate data, wherein the partial image deletion title data are to be attached to a title of the push-type data, wherein the partial image coordinate data indicate a region in which the partial image data are deleted.

8. The image processing apparatus as claimed in claim 1, further comprising:
a control part configured to control the transmission of the push-type data by the transmitting part;
wherein the configuration data include item data formed by dividing the configuration data into separate items,
wherein the control part is configured to generate at least one of first through third channels, wherein the first channel is for transmitting the push-type data in partial image units, the second channel is for transmitting the push-type data in page units, and the third channel is for transmitting the push-type data in item units.

9. The image processing apparatus as claimed in claim 8, further comprising:
a keyword storage part configured to store one or more keywords used for determining whether the push-type data are to be transmitted;
wherein the push-type data contain text data,
wherein the control part is configured to determine whether the push-type data are to be transmitted depending on whether the text data contained in the push-type data are included in the one or more keywords stored in the keyword storage part.

10. The image processing apparatus as claimed in claim 8, wherein the push-type data contain security data indicating a confidentiality level of the image data contained in the push-type data;
wherein the control part is configured to determine whether the push-type data are to be transmitted according to the security data.

11. The image processing apparatus as claimed in claim 8, wherein in a case where the document data contain a plurality of partial image data items, the control part is configured to combine the plural partial image data items into a single partial image data item.

12. The image processing apparatus as claimed in claim 1, wherein in a case where no text data are included in the partial image data, the generating part is configured to extract text located in the vicinity of the partial image data and set the extracted text as a title of the push-type data.

13. The image processing apparatus as claimed in claim 1, wherein in a case where no text is in the partial image data, the generating part is configured to set a predetermined item of the configuration data as a title of the push-type data.

14. The image processing apparatus as claimed in claim 1, wherein in a case where the document data include a plurality of character strings, the generating part is configured to set a most frequently used keyword in the plural character strings as a title of the push-type data.

* * * * *